United States Patent [19]
Kyotani et al.

[11] Patent Number: 5,839,567
[45] Date of Patent: Nov. 24, 1998

[54] CONVEYING SYSTEM

[75] Inventors: Hisashi Kyotani, Osaka; Takashi Okamura, Katano; Kiyoshi Hamano, Moriguchi, all of Japan

[73] Assignee: Daifuku Co., Ltd., Japan

[21] Appl. No.: 584,319

[22] Filed: Jan. 16, 1996

[30] Foreign Application Priority Data

Apr. 20, 1995 [JP] Japan ................................ 7-094080
May 30, 1995 [JP] Japan ................................ 7-130901

[51] Int. Cl.⁶ .................................................. B65G 17/32
[52] U.S. Cl. ......................................... 198/683; 104/172.3
[58] Field of Search ............................. 104/168, 172.3, 104/172.4; 198/683, 684

[56] References Cited

U.S. PATENT DOCUMENTS

| | | | |
|---|---|---|---|
| 422,466 | 3/1890 | Thompson | 104/168 |
| 3,403,633 | 10/1968 | Scharzkopf | 104/168 |
| 3,518,946 | 7/1970 | Kavieff | 104/172.3 |
| 4,542,698 | 9/1985 | Wakabayashi | 104/172.4 |
| 4,616,570 | 10/1986 | Dehne | 104/172.3 |
| 4,771,700 | 9/1988 | Wakabayashi | 104/172.4 |

*Primary Examiner*—William E. Terrell
*Assistant Examiner*—Khoi H. Tran
*Attorney, Agent, or Firm*—Schweitzer Cornman Gross & Bondell LLP

[57] ABSTRACT

The present invention relates to a conveying system such as in an assembly line, more particularly to a plurality of transport cars without motor that are driven in close contact with each other on an endless path on guide rails having curved sections, and a friction feeder for moving the transport cars. The cars have a main body and a support for objects to be conveyed. The main body has a plurality of movable bodies and means for coupling the movable bodies to allow a relative yielding motion between the movable bodies at the curved sections in the conveying paths. Driven faces are formed on the movable bodies parallel to the running direction, and a feeder along the conveying path and having a motor driven feed roller that acts on the driven faces of the movable bodies.

11 Claims, 21 Drawing Sheets

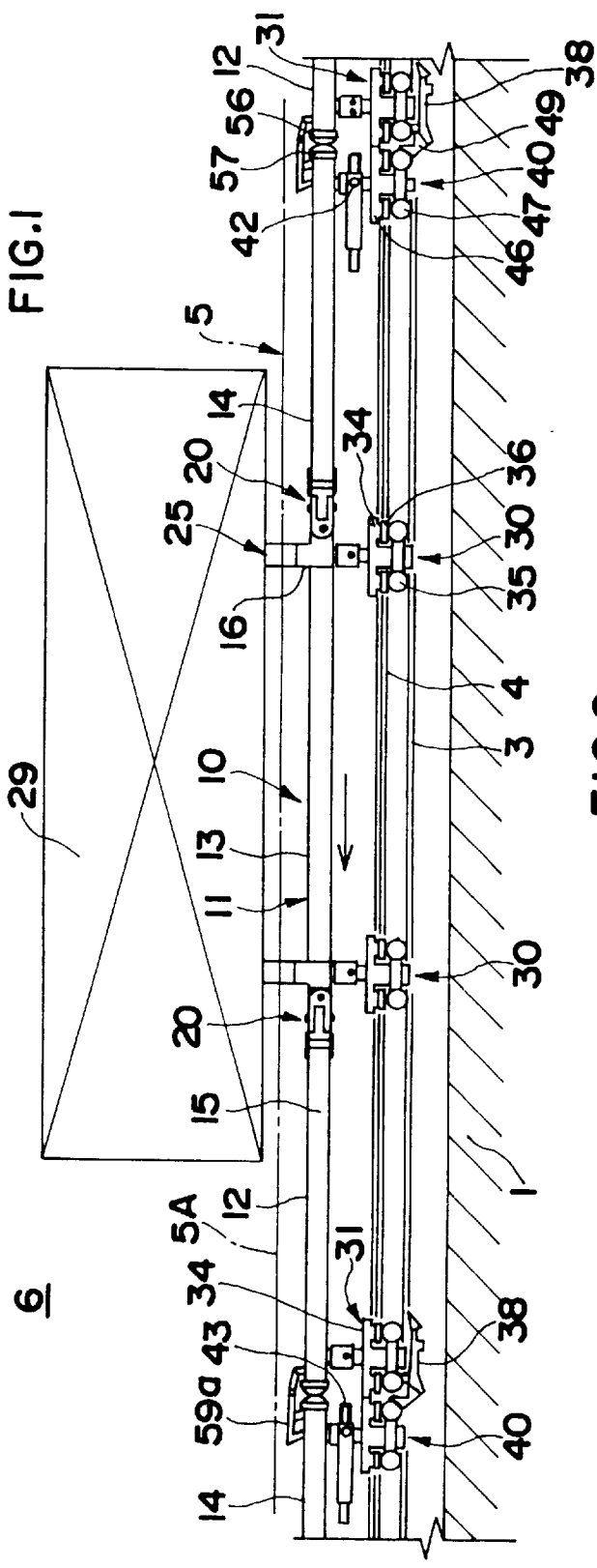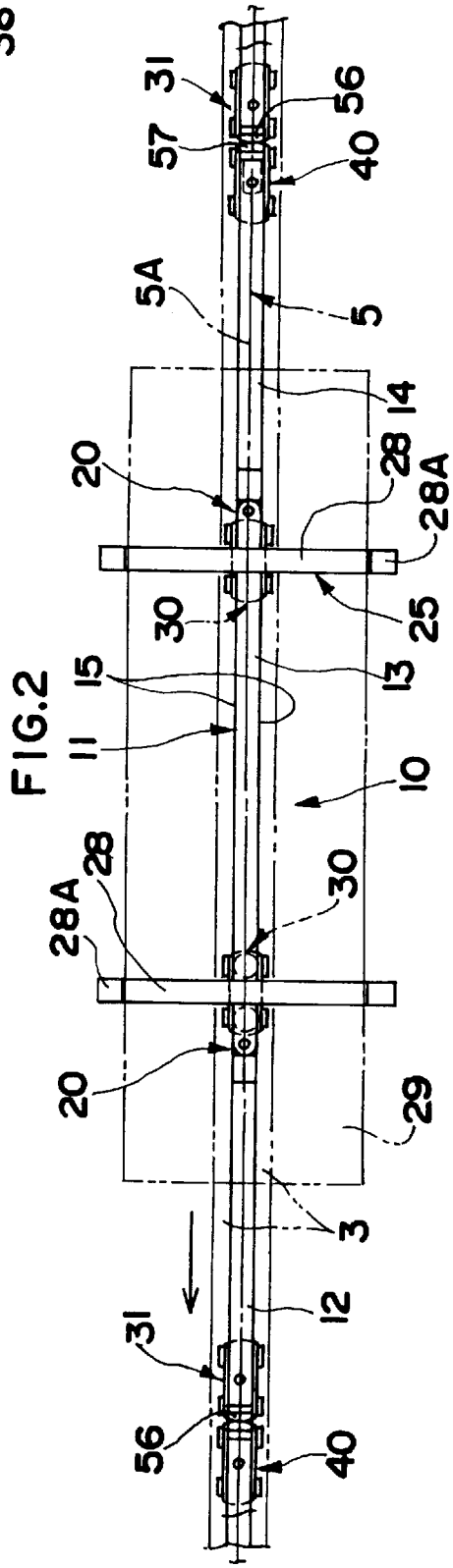

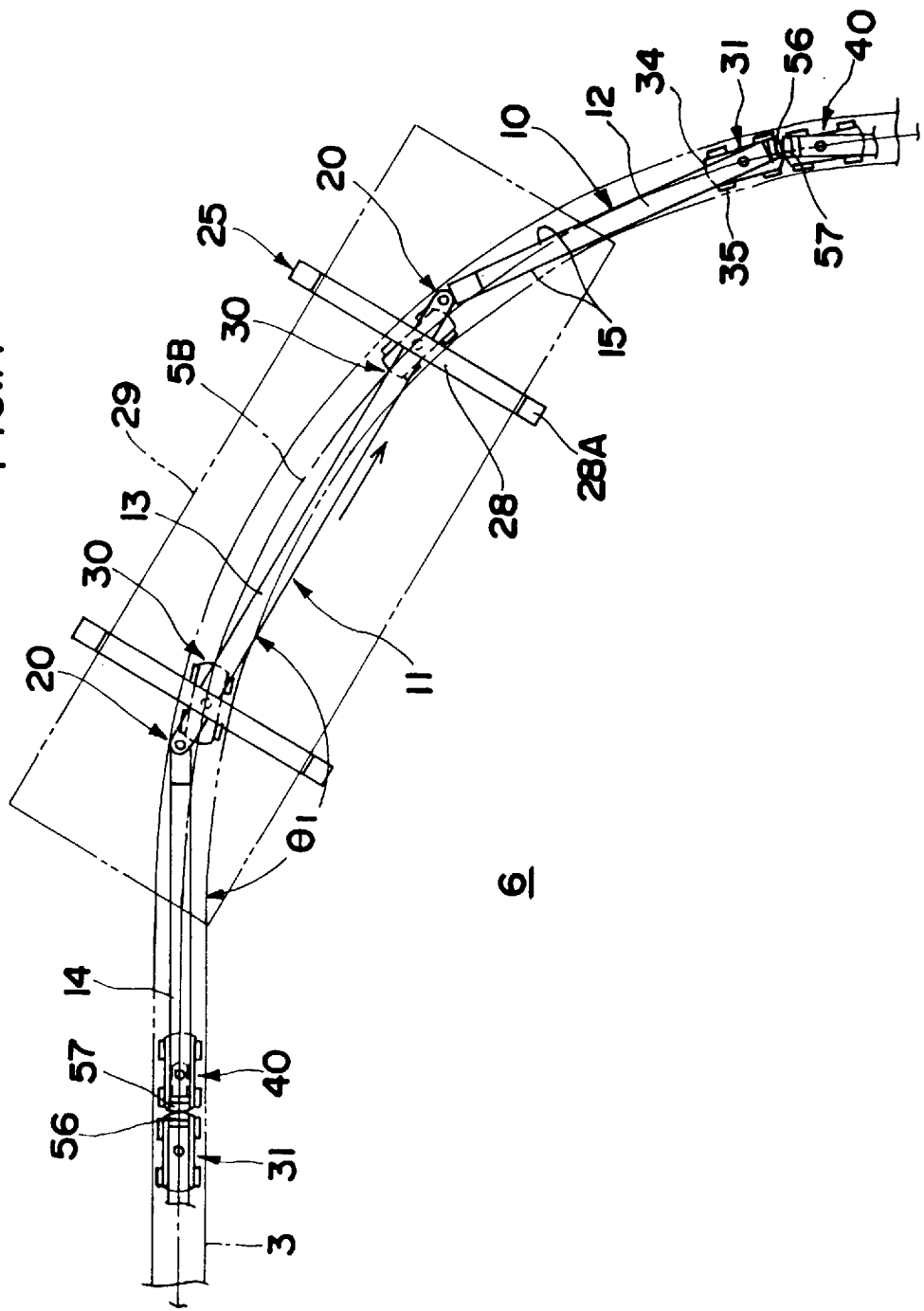

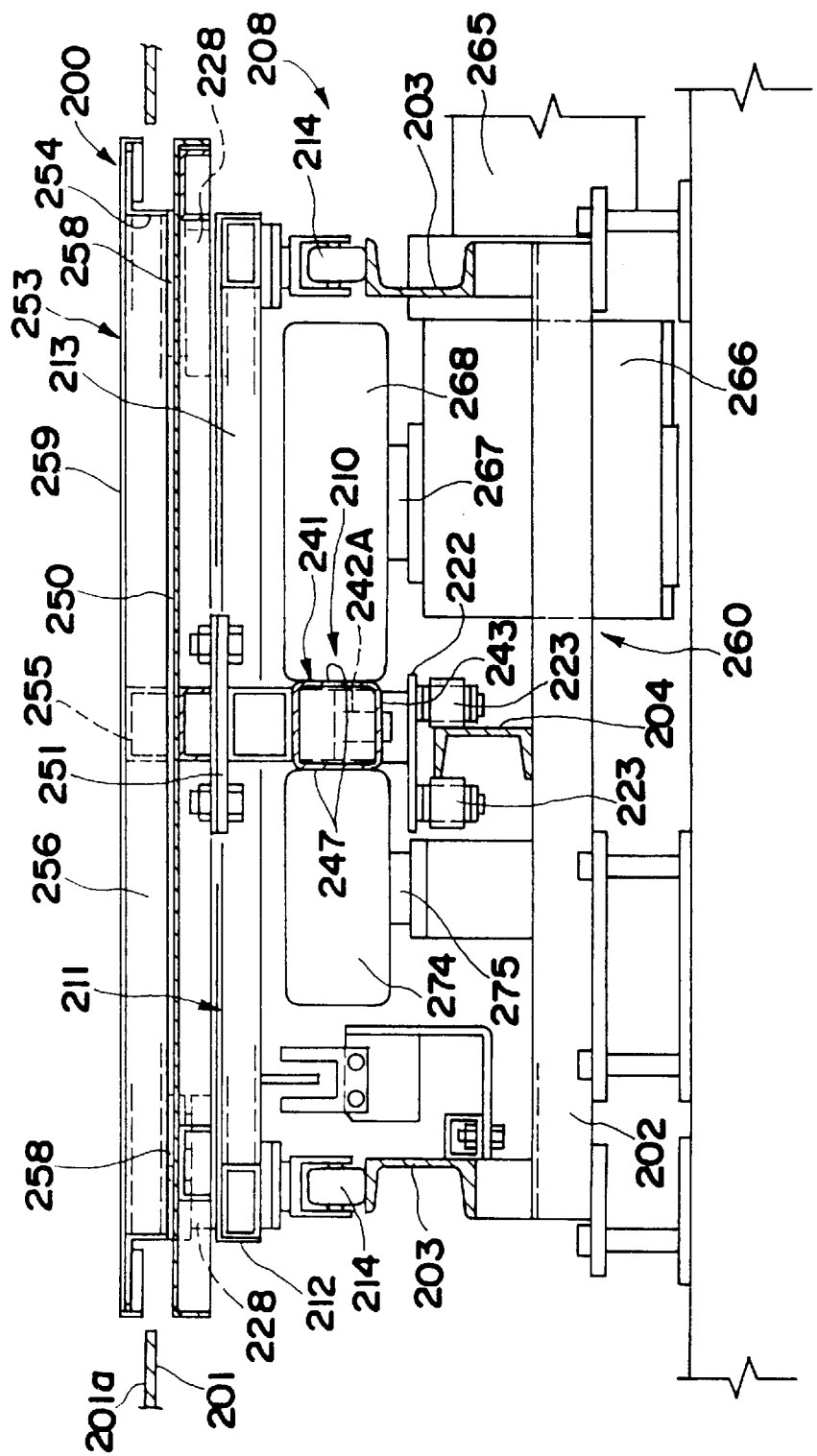

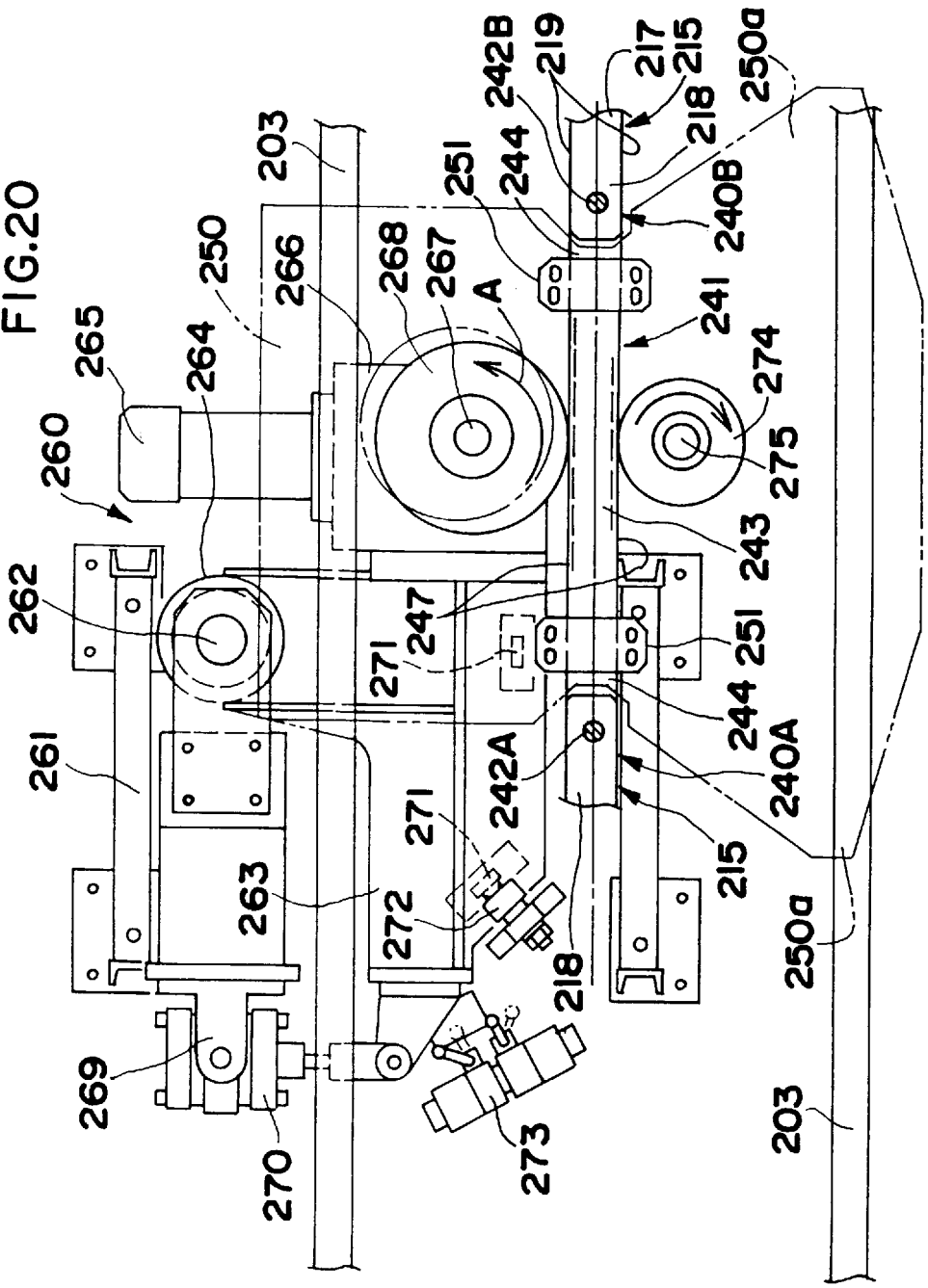

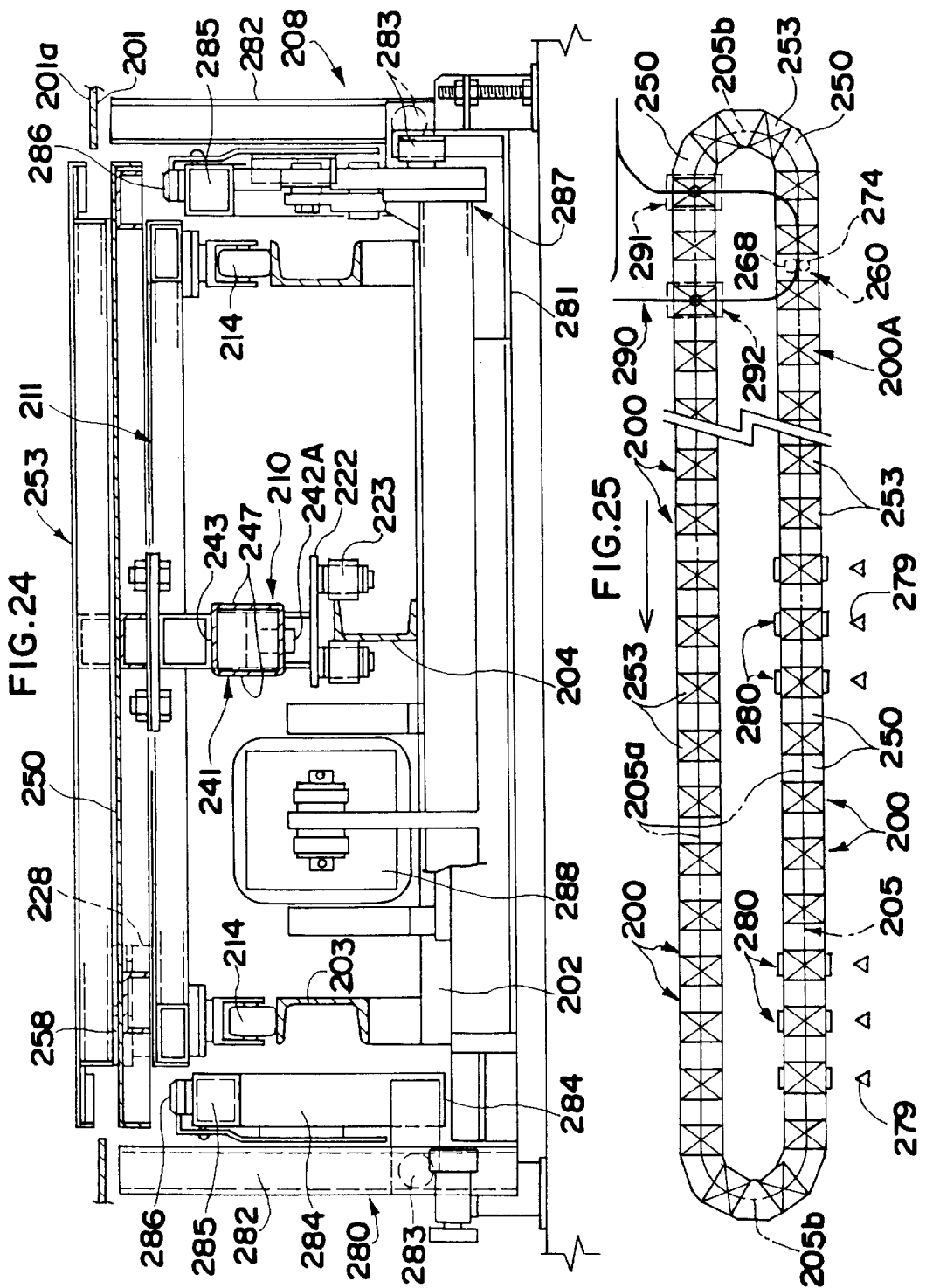

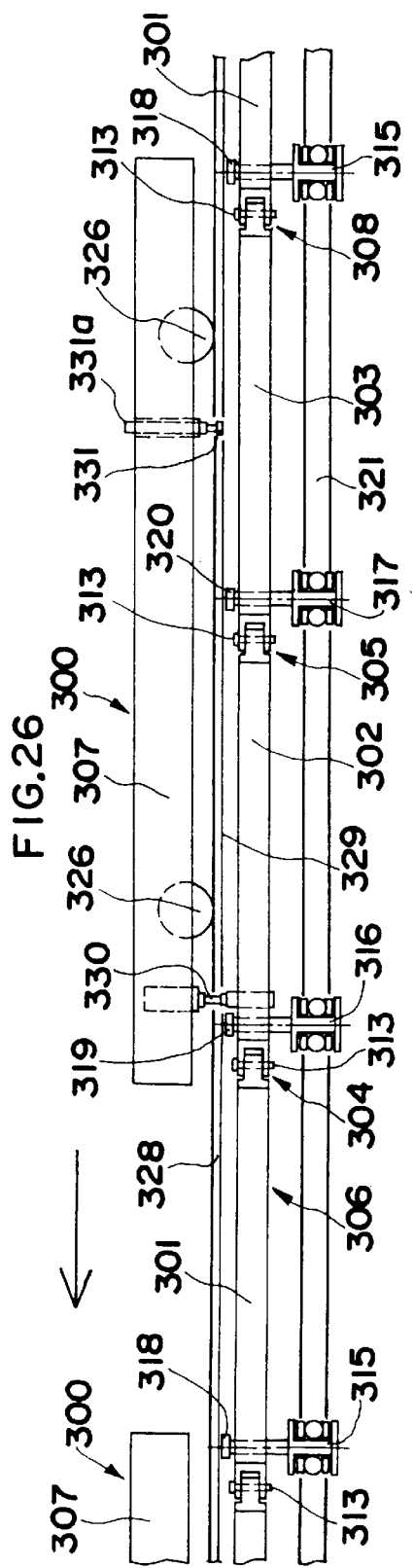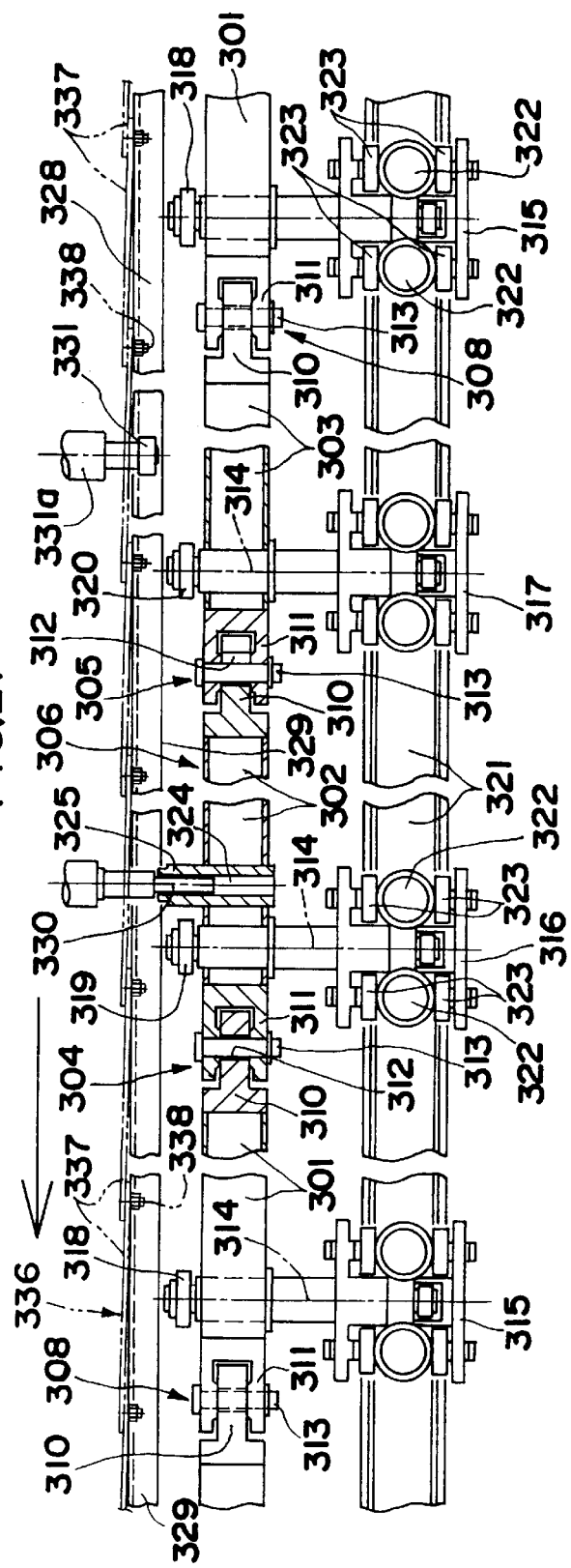

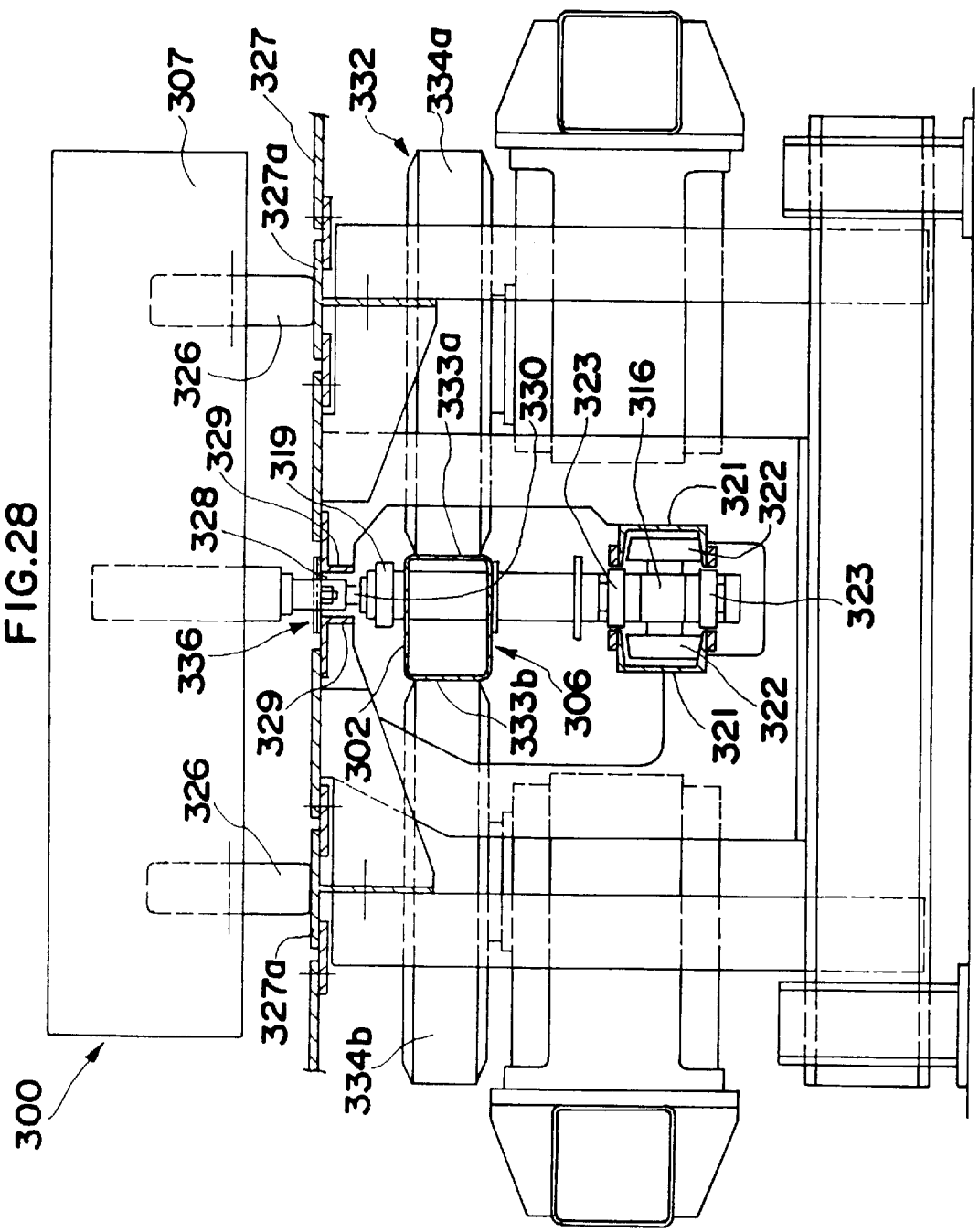

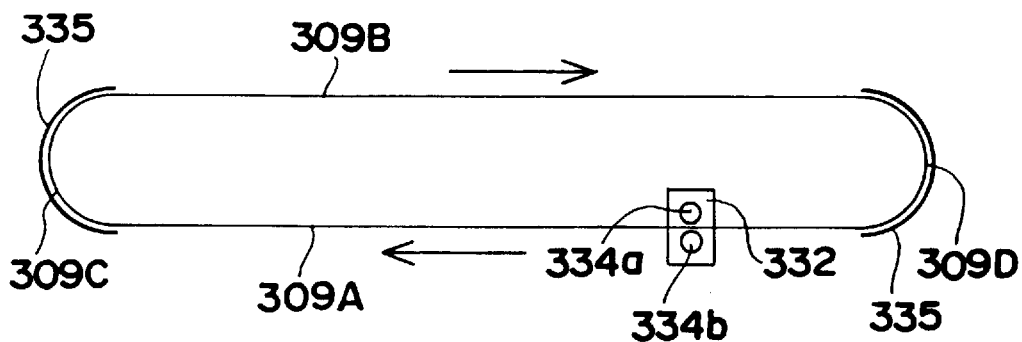
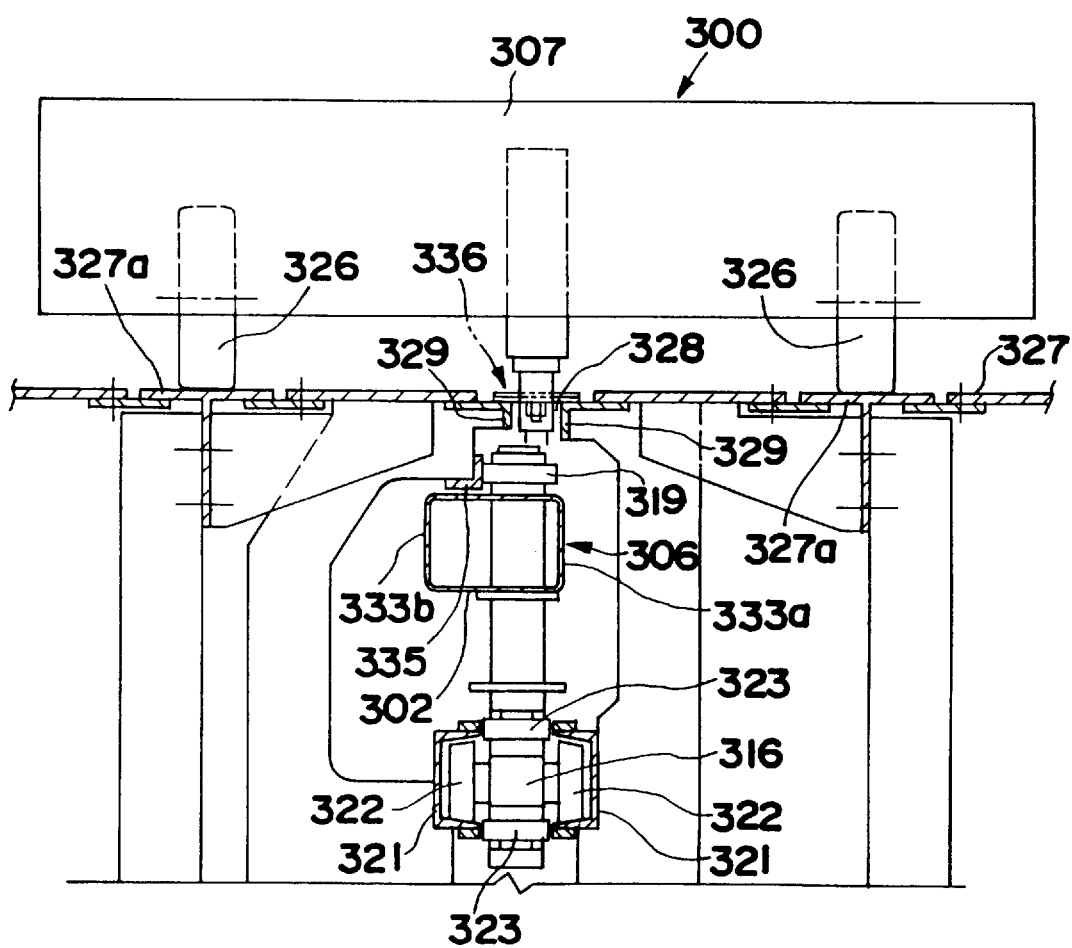

CONVEYING SYSTEM

FIELD OF THE INVENTION

The present invention relates to a conveying system such as in an assembly line of automobiles or the like, and more particularly to a plurality of transport cars without a drive that can be driven in close contact with each other on an endless conveying path.

BACKGROUND OF THE INVENTION

A conveying system in which a plurality of transport cars without a drive are moved along a fixed conveying path is known, such as from published Japanese patent application No. H 2-209309. That conveying system has a friction feeder having friction feed rollers pressed against the side of the transport car, a motor for driving the rollers is disposed at upstream of the conveying path supporting the plurality of transport cars, a friction brake having friction brake rollers pressed against the side of the transport car, and a motor for driving the rollers in a reverse direction is disposed downstream of the conveying path. The transport car contacted with the friction feed rollers is propelled by the friction feeder to push and move all of the transport cars in front of it, and a transport car pushed from behind is prevented by the friction brake from moving by inertia at a higher speed than the following transport car.

However, in such conventional conveying system the transport car has a rigid structure of a single carriage, so that a number of problems were encountered. The transport cars may be pushed and driven smoothly on a straight path, but on a curved horizontal path, an angle between the preceding and following transport cars can become so large that a forward component of the pushing force on the preceding transport car from the following transport car becomes smaller and the running resistance of the preceding transport car increases, and thus the pushing operation is not performed smoothly. The longer the total length of the transport car, the more pronounced is this bothersome phenomenon, so that such larger transport cars could not be used in such a conveying system for long objects.

DESCRIPTION OF THE INVENTION

A primary object of the present invention is to provide a conveying system permitting even longer transport cars to be pushed and propelled on curved horizontal or vertical paths.

With the above and other objectives in view, the present invention provides a conveying system which comprises guide rails disposed along a conveying path having curved sections, a plurality of transport cars movably supported by said guide rails, and a friction feeder for the transport cars, each of said transport cars comprises a main body movably supported on said guide rails, support and guidance means for objects to be conveyed on said transport car, said main body having a plurality of movable bodies, couplers for coupling the movable bodies to allow a relative yielding motion between the movable bodies at the curved sections in the conveying path, and a driven face on the movable body in parallel to the conveying path, said supports being provided on at least one of said movable bodies, said friction feeder being disposed along said conveying path, said friction feeder having a feed roller adapted to act on the driven faces of said movable bodies, and a motor for driving the feed roller.

In the conveying system of the present invention, even when the total length of the transport car is quite large due to the need to transport long objects that are supported on the support, the main body supported and guided on the guide rails by the guidance means is constituted from the movable bodies that are flexibly coupled by the couplers, so that when transport takes place on a curved path, the angular deviation between the movable bodies remains small. In other words, on the curve the angle is small between the front movable body of the pushing following transport car and the rear movable body of the preceding pushed transport car.

In an arrangement in which front and rear ends of the main body of the transport cars are provided with a contact portion for contacting one another when the preceding transport car is pushed by the following transport car, the feed rollers act on the driven portion and the pushing force of the following transport car acts efficiently as a forward propelling force of the preceding transport car on the curved path, so that it is being pushed and driven smoothly.

Since the movable bodies constituting the main body of the transport car can be formed into the shape of a bar which is smaller than the width of the support supporting the objects, even when the pushing and propelling the preceding transport car takes place along a curved path, the lateral variance acting on the curved horizontal guide rails is minimal, and thus the transporter can be pushed and driven smoothly and efficiently.

There is a zone in the conveying path in a suitable embodiment of the conveying system of the present invention, in which the transport car is pushed and driven by the feeder, and a zone in which the transport car is forcibly driven by a disengageable feeder having a driven body disposed at the front of the main body of the transport car, drive-release operating means are disposed at the rear of the main body, a pusher moves along the conveying path and engages the driven body which with the pusher are disengageable from each other so that when the following transport car approaches a preceding standing transport car, the drive-release operating means of the standing preceding transport car disengages the driven body of the following transport car from the pusher.

In this configuration, the transport cars can be connected one after another in a train and driven at a constant speed in the pushing and driving zone, and the transport cars can be suitably spaced according to the distance of the pusher, and be driven by the disengageable feeder at a constant speed in the forcibly driven zone. In other words, while conveying the objects by the same transport car, the running condition can be changed responsive to work on the objects, and the transport cars can be automatically stored in the forcibly driven zone by the disengageable feeder.

In this case, the driven unit is mounted on the guidance means disposed on the front end of the front movable body, and the drive-release operating unit is mounted on the guidance means disposed on the rear end of the rear movable body. At least, one of the guidance means with the driven unit and the guidance means with the drive-release operating unit are movably supported within a fixed range in the running direction relative to the movable body supporting the guidance means, and held in a fixed position by a spring.

In such configuration, when the transport cars are pushed and driven by the feeder, the guidance means with the driven unit and the guidance means with the drive-release operating unit, which are positioned respectively at the front end of the following transport car and at the rear end of the preceding front transport car, are adjacent to each other. The drive-release operating unit of the preceding transport car is in the state of switching the driven unit of the following transport car to a non-operating position (disengaging position to the pusher). Thus, when there is a curved vertical path forming opposite ends of an ascending path, and a descending path in the traveling path and, further where the main body (movable bodies) is on the upper side relative to the guide rails, the contact positions for pushing the preceding and following transport cars separate as the transport car passes the end portion of the ascending path and the start portion of the descending path. The pushing operation is carried out by the guidance means with the driven unit positioned at the front end of the following transport car and the guidance means with the drive-release operating unit positioned at the rear end of the preceding transport car.

In the above-mentioned configuration, an urging force by the spring is set to be weaker than a pushing force by the feeder, so that, when the guidance means with the driven unit positioned at the front end of the following transport car and the guidance means with the drive-release operating unit position at the rear end of the preceding transport car push one another in the manner described, at least one of the guidance means is withdrawn against the bias of the spring, and the contact portions at end portions of the movable body for transferring the pushing force contact one another to prevent the distance between the preceding and following transport cars from becoming larger, thus to achieve a good pushing operation.

Furthermore, an engaging piece and an engageable portion can be disposed at the front and rear ends of the transport cars. The engaging piece and the engageable portion are disengageable from one another, and are used for coupling the adjoining preceding and following transport cars. According to this configuration, the adjoining preceding and following transport cars are connected in a train by coupling one another with the engaging piece and the engageable portion and are driven by the feeder, thereby a group of following transport cars at the upstream of the feeder are also tractive and drivable.

In an embodiment of the conveying system in which the conveying path is endless and the transport cars arranged in closed contact throughout the endless conveying path are circulated in a unit, the movable bodies of the main body of the transport car can be coupled to one another swingably in the laterally horizontal direction by the coupling means, and the transport cars can be connected in an endless train by the coupling means for coupling one another swingably in the laterally horizontal direction.

When adopting such a configuration, the main body of the transport cars can be constituted of the movable body having the support for objects being conveyed and of the movable body having a work deck so that even during conveying the objects, the operator on the work deck can work on the objects mounted on the support for objects.

An expansion allowing portion is also provided for permitting the expansion of the total length of the group of transport cars connected into an endless train, so that the movable bodies turning along the circular curved horizontal path in the endless conveying path change positions to prevent excessive tension and unreasonable slack on the group of transport cars connected into an endless train and to provide for a smooth rotation thereof.

At least one movable body among the movable bodies constituting the main body of, at least, one of the transport cars is lengthwise adjustable in the running direction, so that an error between the total length of the endless conveying path and the total length of the group of transport cars connected into an endless train in the conveying path can be absorbed by adjusting the length of the movable bodies.

BRIEF DESCRIPTION OF THE DRAWING

Embodiments of the present invention are described with reference being had to the accompanying drawings, wherein FIG. 1 is a side view of a first embodiment of the present invention;

FIG. 2 is a plan view of the transport car;

FIG. 13 is a schematic plain view showing an entire layout of a conveying path of the embodiment;

FIG. 14 is a plan view of the transport car at a curved horizontal path in the conveying path;

FIG. 19 is a cross-sectional front view taken along the line 19—19 of FIG. 17, of a feeder driving the transport car;

FIG. 20 is a cross-sectional plan view of a feeder driving the transport car;

FIG. 21 is a cross-sectional side view of a coupler between the transport cars, and a detailed structure of the transport car with a lengthwise adjustable main body;

FIG. 24 is a cross-sectional front view of the lift and the transport car;

FIG. 25 is a schematic plan view of an entire layout of a conveying path of the second embodiment;

FIG. 26 is side view of a third embodiment of the invention and a transport car;

FIG. 27 is a partly cross-sectional side view of a main body of the transport car;

FIG. 28 is a cross-sectional front view taken along the line 28—28 of FIG. 26, of the third embodiment;

FIG. 29 is a schematic plan view of a complete layout of a conveying path of the third embodiment; and FIG. 30 is a cross-sectional front view of a guide means of a transport car at a U turn portion of the transporting path.

DETAILED DESCRIPTION

Figure 3:
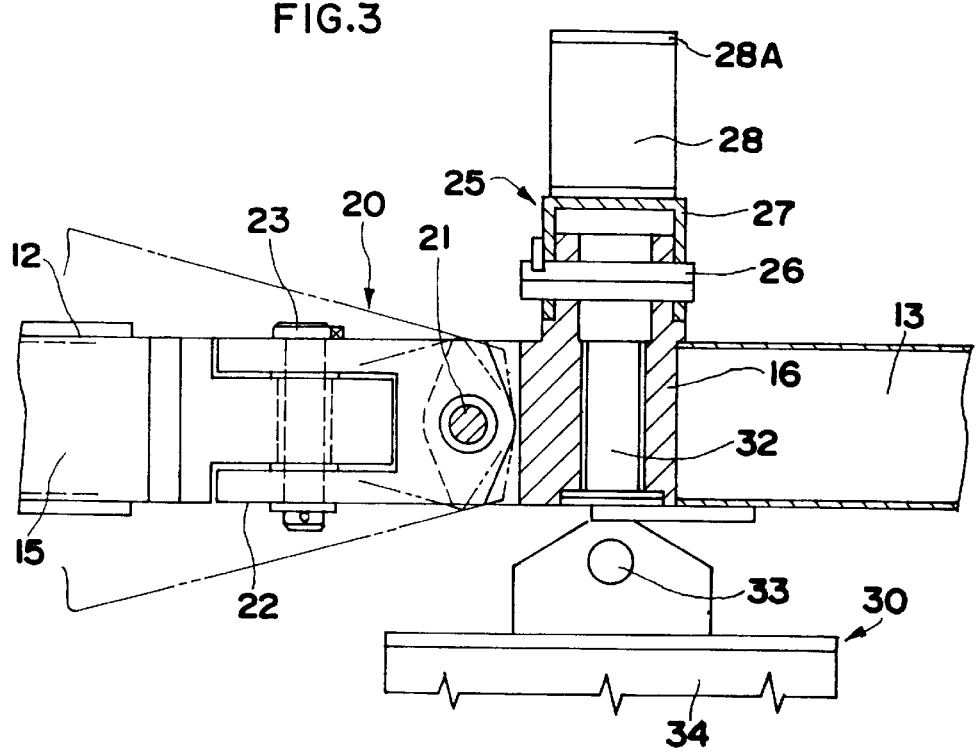
FIG. 3 is a partly cross-sectional view of a coupling means in a main body of the transport car.

In a first embodiment of the present invention, as particularly shown in FIGS. 1, 2, 7, 13, a pair of guide rails 3 are disposed parallel to one another and are supported on a floor 1 by a frame 2, and a square bar cross section guide member 4 is laid on the top surface of the guide rails 3. A conveying path 5 is formed by the guide rails 3, and as shown in FIG. 13 the conveying path 5 is formed into an elliptical, endless shape by a pair of linear sections 5A which are parallel to each other, and curved horizontal sections 5B connecting between the end portions of the linear sections 5A.

The endless elliptical conveying path 5 is divided into two portions at a pair of linear sections 5A parallel to each other, one side of which is used as a dense moving zone 6 and the other side is used as an expanded moving zone 7. An ascending path 5a is included in one linear sections 5A, and a descending path 5b is incorporated in the other linear sections 5A in the dense moving zone 6.

A plurality of transport cars 10 are supported on and guided by the guide rails 3 and move on the conveying path 5. A main body 11 of the transport car 10 is formed by three movable bodies 12, 13 and 14. The movable bodies 12, 13, and 14 each are square cross section tubes and their respective opposed sides constitute driven faces 15. Coupling means 20 are provided between the front movable body 12 and center movable body 13, and between the center movable body 13 and the rear movable body 14 for swingably coupling the adjacent bodies with each other both in vertical and horizontal directions. As shown in FIGS. 1–3, the coupling means 20 are provided between end members 16 integrated with the front and rear ends of the center movable body 13 and facing ends of the front and rear movable bodies 12, 14 to constitute a trunion, wherein a coupler 22 is mounted vertically swingably to the end member 16 by a horizontal pin 21, while being laterally swingably coupled to the facing ends of the front and rear movable bodies 12, 14 by a vertical pin 23.

A support for conveyed objects 25 and front and rear guidance means 30 supported and guided by the guide rails 3, are disposed on at least one of the movable bodies 12, 13 and 14, in this embodiment particularly the center movable body 13. Guidance means 31, 40 are supported on the remaining front and rear movable bodies 12, 14 in this embodiment and are guided by the guide rails 3, and are disposed at the free ends away from the center movable body 13, providing support for conveyed objects 25.

The support for conveyed objects 25 includes a bracket 27 attached to an upper portion of the end member 16 by a joining pin 26, and lateral support frames 28 are provided on the bracket 27. Supports 28A are provided on laterally opposite ends of the support frames 28 for conveyed objects 29 such as an automobile body to be disposed thereon.

Front and rear guidance means 30 provided on the center movable body 13, each include a trolley having a vertical pin 32 fixed rotatably to the end member 16, a trolley body 34 rotatably coupled to the lower end of the vertical pin by a horizontal pin 33 and front and rear supporting rollers 35 horizontally pivoted on opposite sides of the trolley body 34 and engaged with the guide rails 3, and front and rear steady rest rollers 36 vertically pivoted from the upper portion of the trolley body 34 and guided between the guide members 4 of the guide rails 3.

Figure 4:
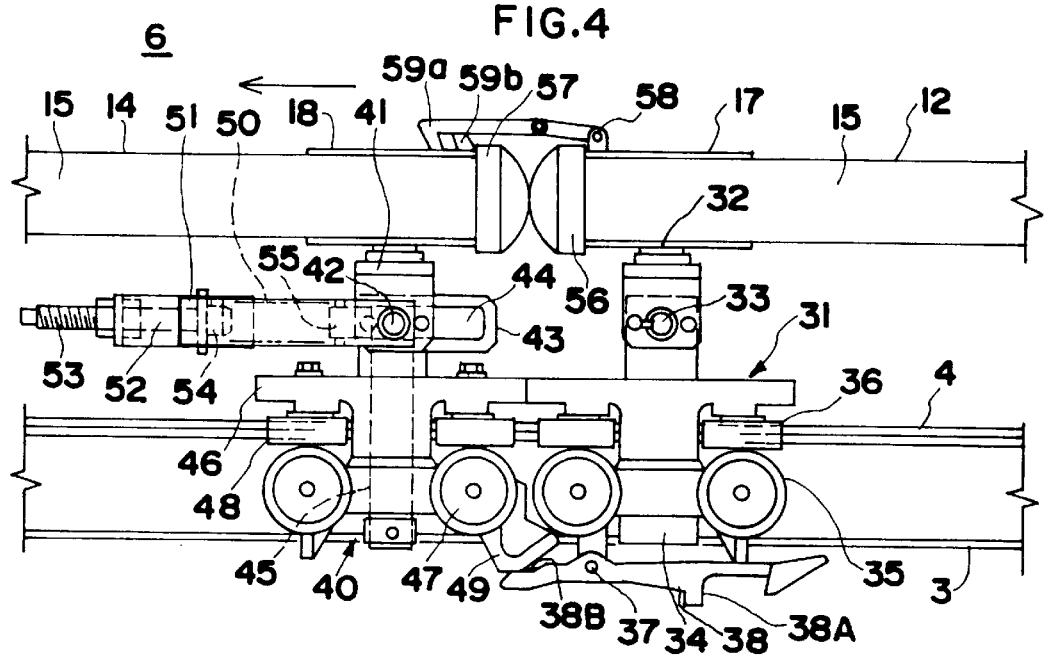
FIG. 4 is a side view of a contact portion between transport cars.
Figure 5:
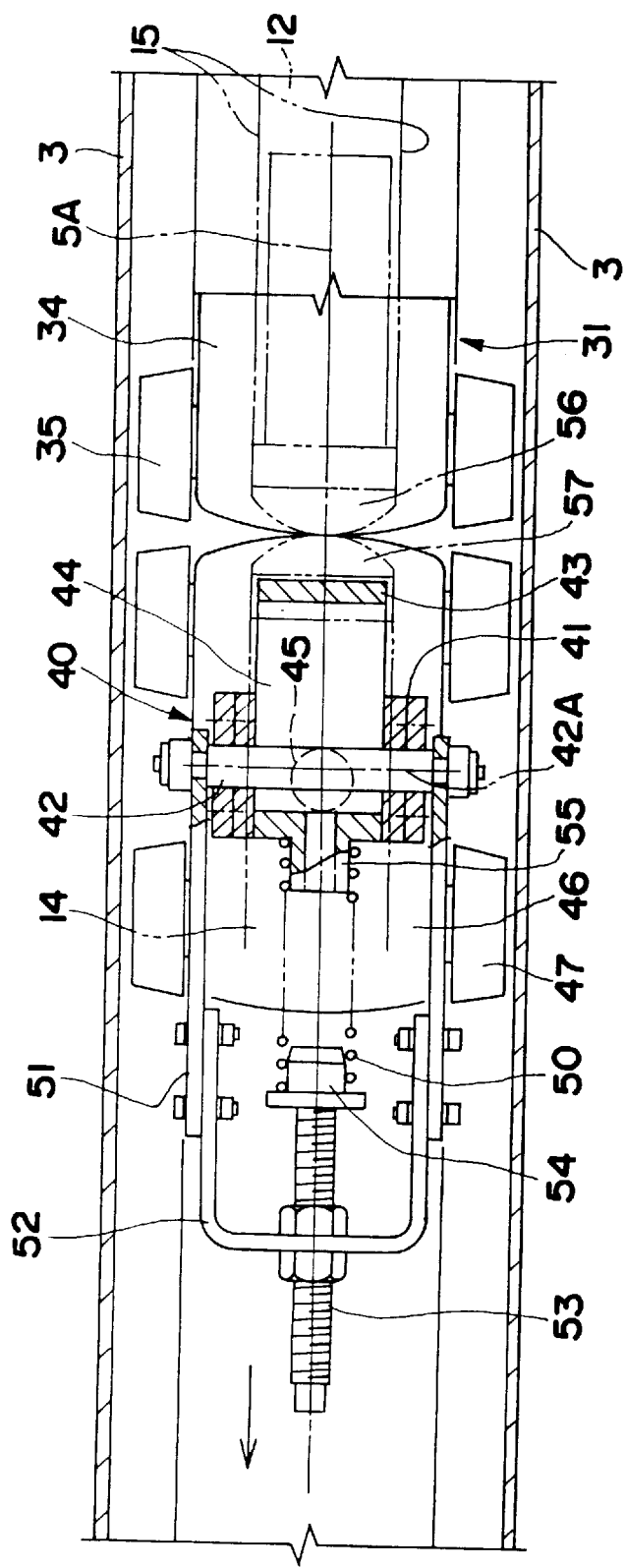
FIG. 5 is an expanded cross-sectional plan view of essential parts of the contact portion.
Figure 7:
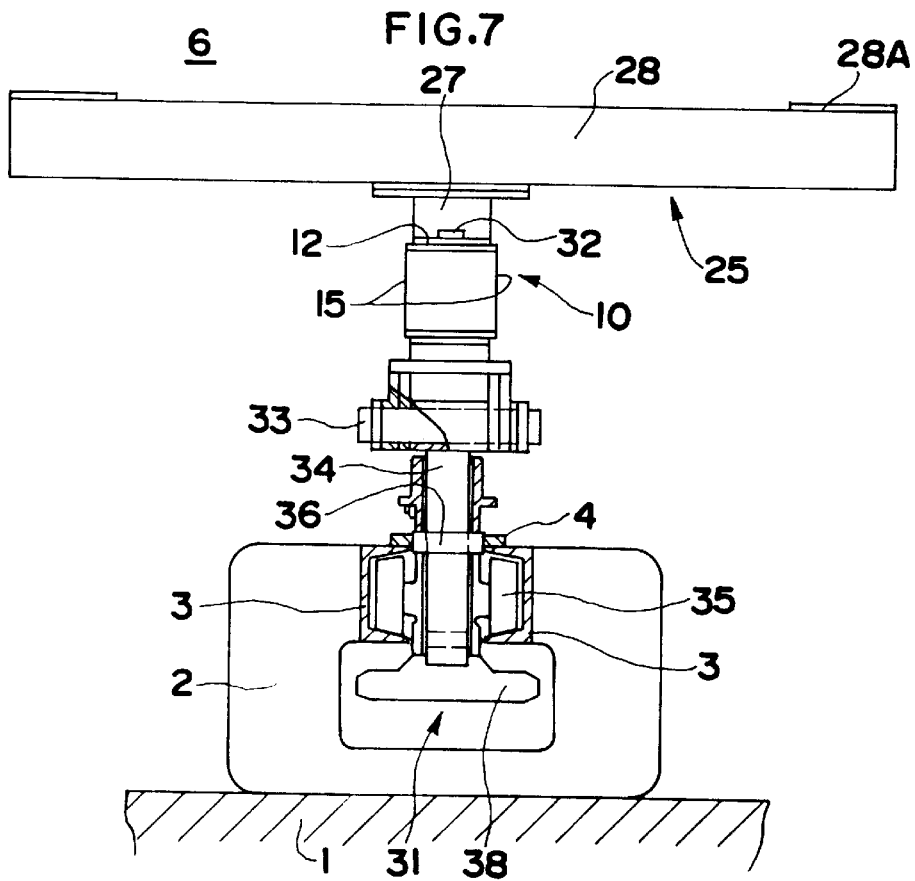
FIG. 7 is an expanded front view of essential portions.

The guidance means 31 provided at the lower end of the movable body 12 has the same configuration as the lower end of the guidance means 30, and as shown in FIGS. 1 and 7, utilizes the vertical pin 32 rotatable within an end 17 of the movable body 12, the horizontal pin 33, the trolley body 34, the rollers 35, and the rollers 36. As seen from FIG. 4, a lever 38 is vertically pivotably disposed under the trolley body 34 at a position near its front end, swingable about a horizontal support pin 37. A rear engaging backward face 38A is formed at a portion extending backward from the support pin 37 of the lever 38, and operating face 38B is formed on the top of a portion of the lever, extending forward from the support pin 37.

Guidance means 40 provided on the free end of the rear movable body 14 is movably coupled from the rear movable body 14. As shown in FIGS. 1, 2, 4, and FIG. 5, a bracket 41 is disposed under the end member 18 provided on the free end of the rear movable body 14, and a horizonal pin 42 is passed through the bracket 41. A front-to-rear movable body 43 is movably attached from the horizontal pin 42.

A vertical pin 45 ranges downward from the movable body 43, through a trolley body 46 of the guidance means 40. The trolley body 46 is rotatable on the pin 45. Supporting shaft rollers 47 and lateral steadying rollers 48 are pivoted from the trolley body 46. The guidance means 40 is thus pivotably coupled to the rear movable body 14 about an axis 42A of the horizontal pin 42, and is also movably coupled within a fixed front-to-rear range by the pin 42 and a front-to-rear slot 44. A drive-release actuator 49 of the following transport car, which acts on the operating face 38B of the lever 38 to swing it so that its rear engaging face 38A moves under the trolley body 46 upward to protrude backward. The guidance means 40 is further provided with a spring 50 which urges it backward. Right and left side plates 51 of a U-shaped bracket 52 are supported by opposite ends of the horizontal pin 42, and the spring 50 is interposed between a cradle 54 mounted backward to the bracket 52 by a front-to-rear position adjusting bolt 53 and a cradle 55 facing forward and formed integrally with the front-to-rear movable body 43.

The front and rear ends of the main body 11 of the transport car 10, or the front end of the end 17 of the front movable body 12 and the rear end of the end 18 of the rear movable body 14 are formed into contact bumpers 56, 57. A hooked engaging lever 59a extends forward from the end of the movable body 12 and is swingably pivotable about a horizonal pin 58. An engaging protrusion 59b on the end of the movable body 14 is adapted to engage the hooked end of the engaging levers 59a whereby the transport cars 10 can be coupled into a train. The engaging lever 59a can be held at a lowered engaged position by gravity or by a spring (not shown).

Figure 6:
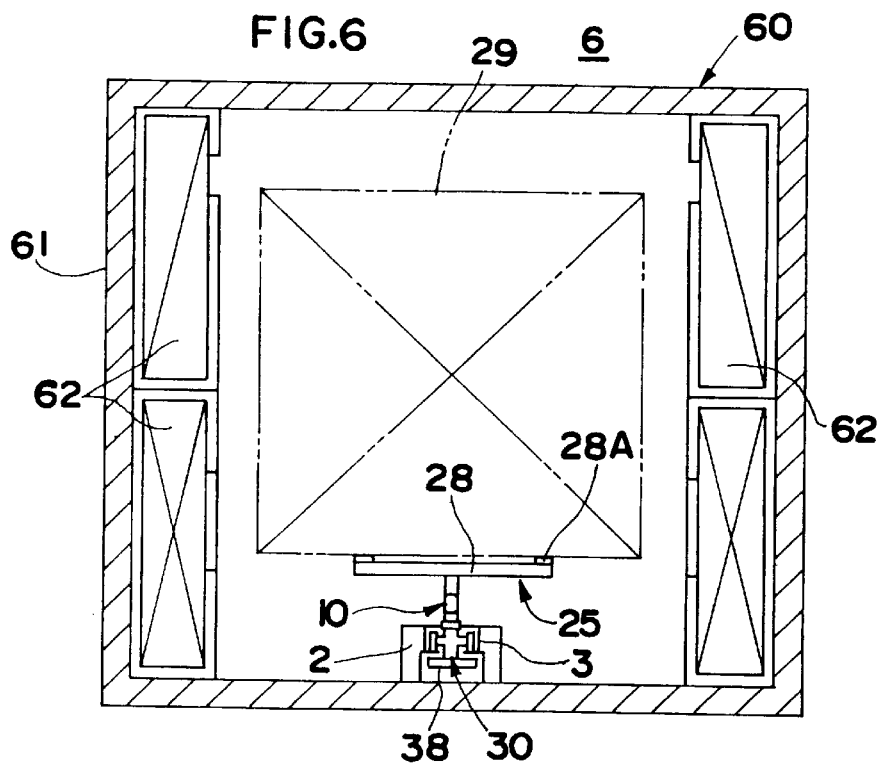
FIG. 6 is a cross-sectional front view of a drying oven to which objects are conveyed.

As shown in FIGS. 6, 7 and 13, a drying oven 60 is provided in the dense moving zone 6 from a slightly upstream side of the ascending path 5a to a slightly downstream side of the descending path 5b. The drying oven 60 has a rectangular body 61 and dryers 62 arranged inside the body 61.

A friction feeder 70 is dispersed in the dense moving zone 6 slightly upstream from the inlet of the drying oven 60. The feeder 70 is in frictional contact with the driven faces 15 on both sides of the main body 11 of the transport car 10 and propels the transport car 10. The friction feeder 70 includes the movable bodies 12 to 14.

Figure 8:
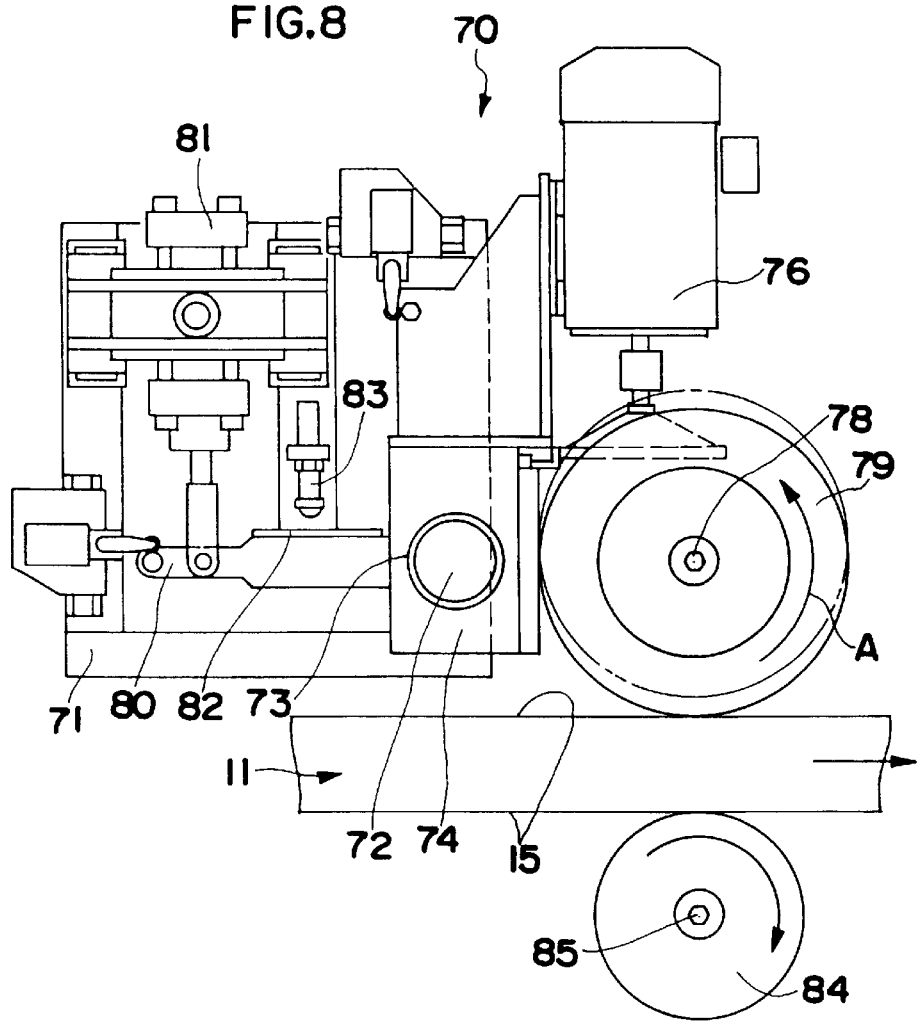
FIG. 8 is a plan view of a feeder driving the transport car.
Figure 9:
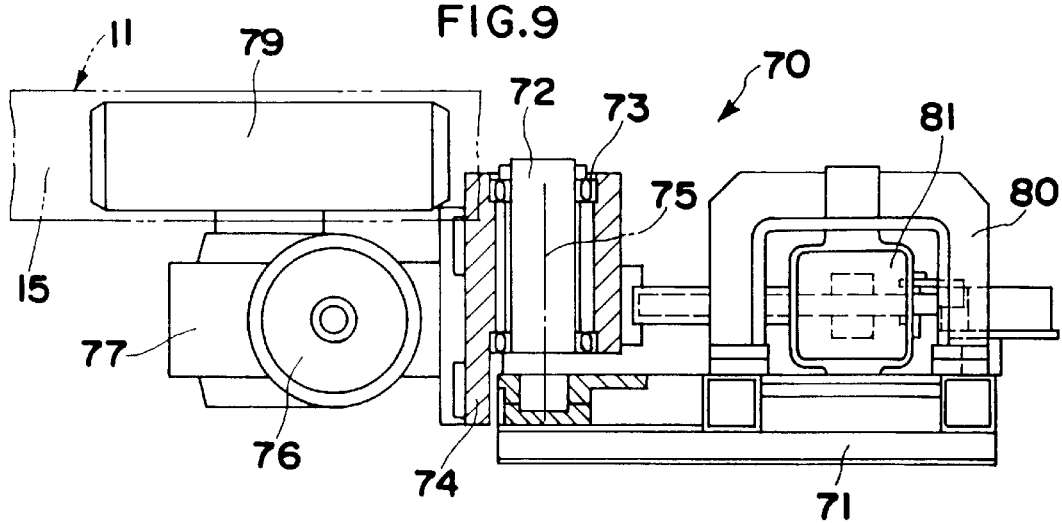
FIG. 9 is a partly cross-sectional side view of the feeder.
Figure 10:
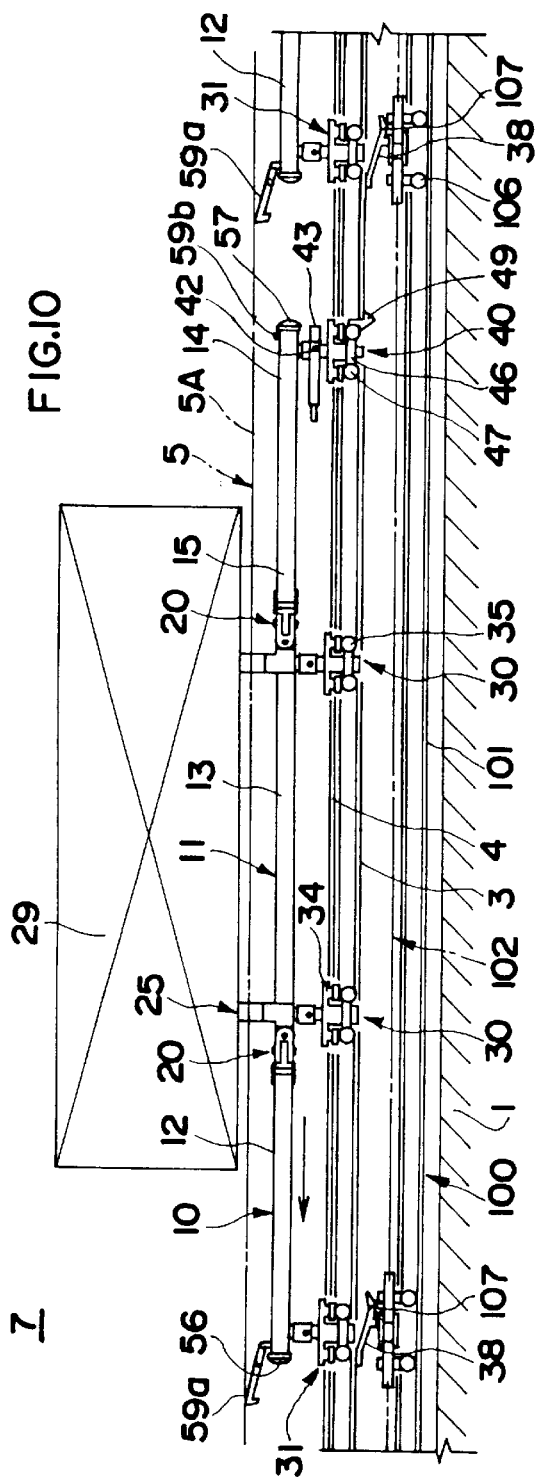
FIG. 10 is a side view illustrating a disengageable feeder commonly used in the first embodiment of the invention.
Figure 11:
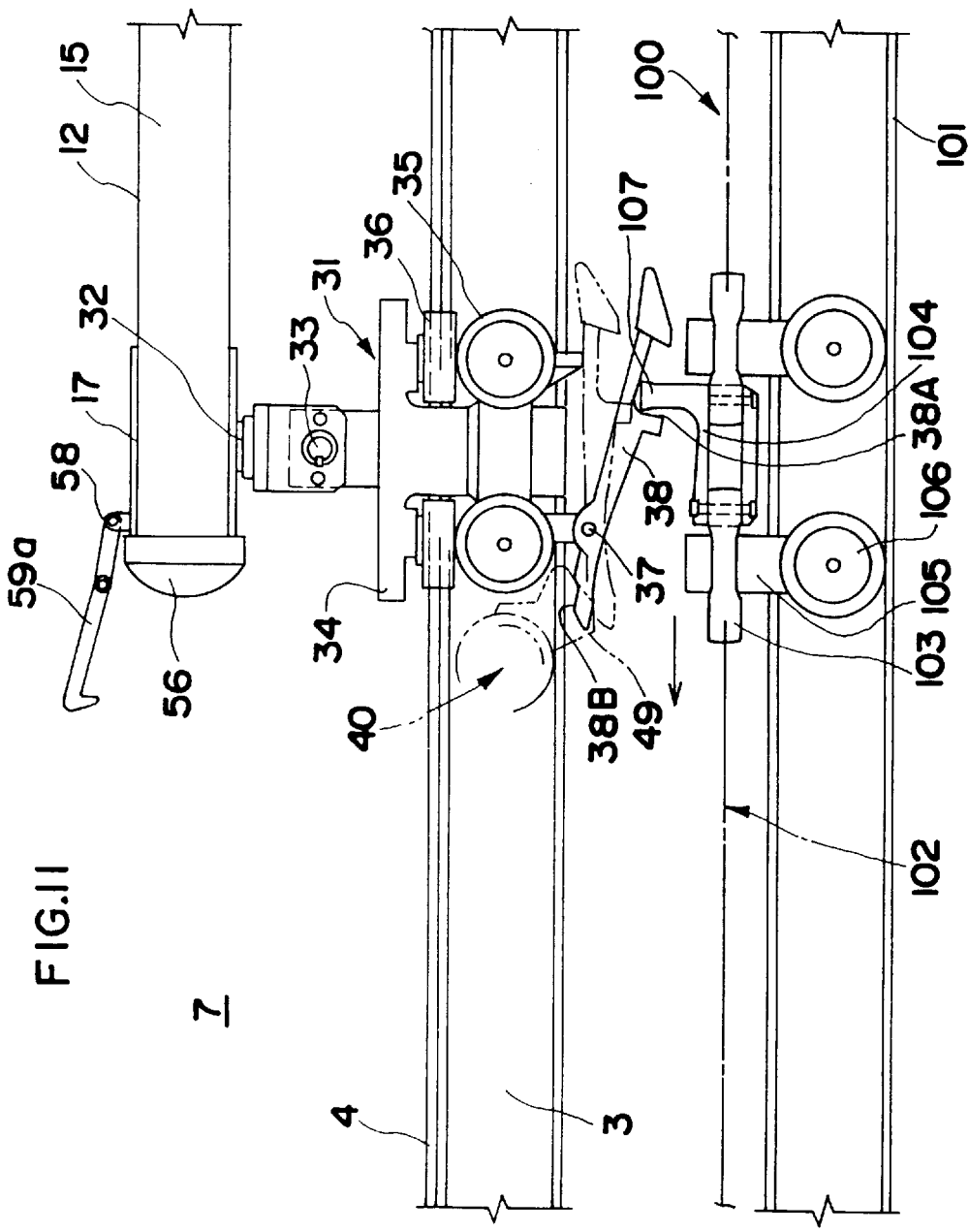
FIG. 11 is an expanded side view of essential portions of FIG. 10.
Figure 12:
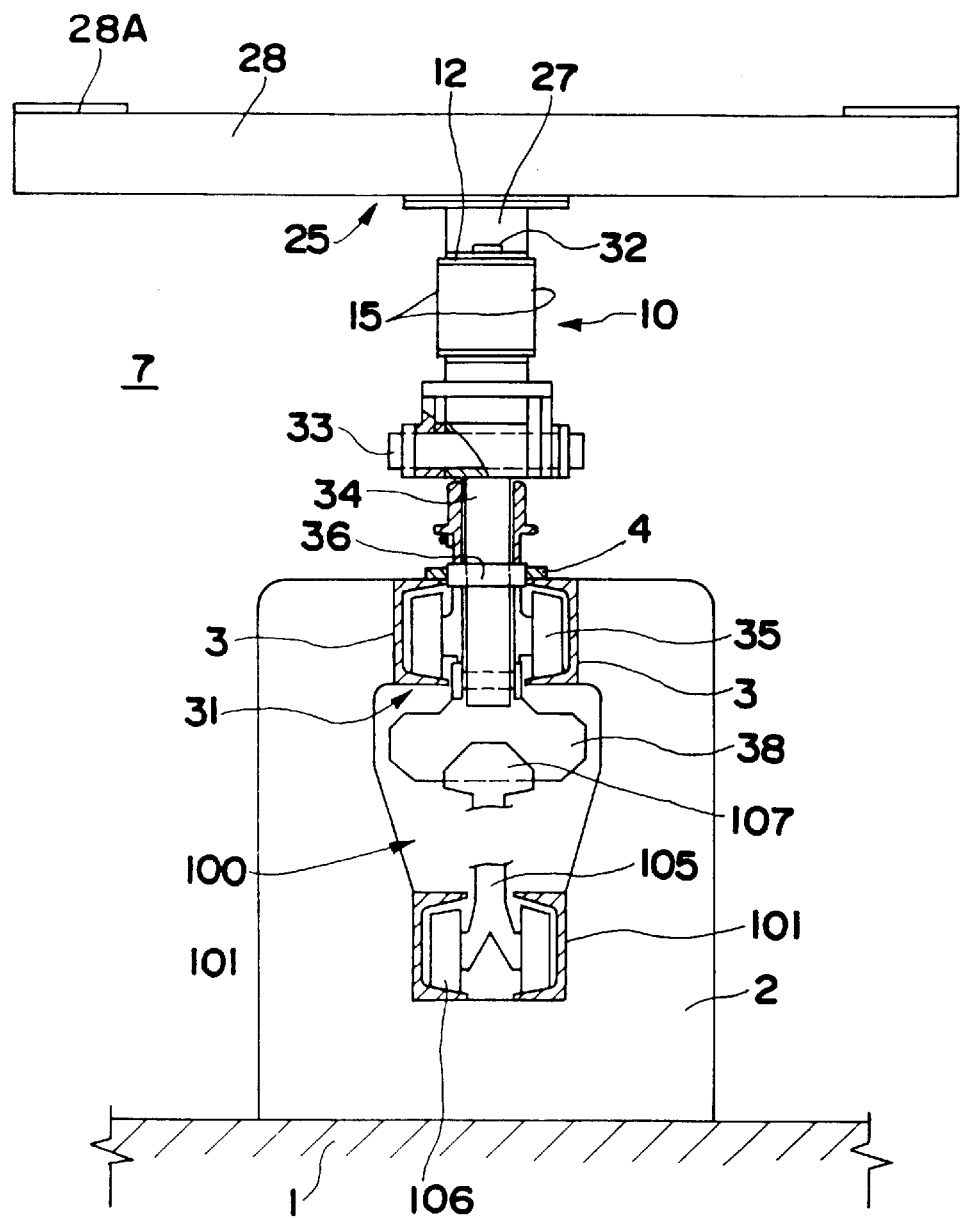
FIG. 12 is a partly cut away front view of FIG. 11.

As shown in FIGS. 8 and 9, a shaft 72 is disposed on the side of the guide rails 3, on a base 71 of the feeder 70, extending from the frame 2, and a supporting member 74 is mounted about on axis 72 of pivotally on the longitudinal shaft 72 by bearings 73. A motor 76 and a reduction gear 77 are disposed on the supporting member 74. A friction drive roller 79 made e.g. of polyurethane, is mounted to an output shaft 78 of the reduction gear 77, and the friction drive roller 79 is driven by the motor 76 through the reduction gear 77. An arm 80 is connected to the supporting member 74 and a cylinder unit 81 is interposed between the arm 80 and the base body 71.

By operating the cylinder unit 81, the supporting member 74 is swung about the longitudinal axis 75 to move the friction drive roller 79 to and from the driven face 15 on one side of the main body 11 of the transport car 10. A contact member 82 is disposed on the supporting member 74 and a limit stopper 83 contacting the contact member 82 is provided adjustably on the base body 71 for the purpose of deciding a marginal approach of the friction feed roller 79 against the driven face 15. Facing the friction feed roller 79 freely rotatable a counter roller 84 contacts the other driven face 15.

As shown in FIG. 13, a friction brake 90 is provided slightly downstream from an outlet of the drying oven 60, in the dense moving zone 6, and the brake acts on the driven face 15 of the main body 11 of the transport car 10 for braking the car. Feed-in means 95 is disposed slightly upstream of the friction feeder 70 and feed-out means 96 is disposed slightly downstream of the friction brake 90. The arrangement of the friction feeder 70, the friction brake 90, and the feed-in and feed-out means 95 and 96 can be changed, and the optional friction brake 90, feed-in means 95 and feed-out means 96 may be entirely or partly omitted.

The friction brake 90 has the same structure as the friction feeder 70, and has a friction brake roller 91 made e.g. of polyurethane, alternately contacting and separating from the driven face 15 on one side of the main body 11 of the transport car 10, a torque motor 92 which gives a reverse rotating force B to the friction brake roller 91 and a counter roller 93 contacting the other driven face 15. The reverse rotating force B of the torque motor 92 is set to be smaller than a feed rotating force A of the motor 76 of the friction feeder 70. The feed-in means 95 and the feed-out means 96 also have the same structure as the friction feeder 70.

A disengageable feeder 100 is shown in FIGS. 10 through 13 in a path from the vicinity of the starting end to an exit of the curved horizontal path 5B in the expanded moving zone 7. The feeder 100 has a pusher 107 which is engageable with and disengageable from the lever 38 of the transport car 10. Right and left channel guide rails 101 are supported under the guide rails 3 by the frame 2, facing their respective open portions.

The pusher 107 is an upward ranging part of a body from one of the side links 103 of a drive chain 102. A trolley 105 is mounted on front and rear center links 104 of the side link 103 with the pusher 107. The trolley 105 has right and left supporting rollers 106 engaging the channel guide rails 101. The drive chain 102 is stretched endlessly between a plurality of guiding idler gears 108 and a driving gear 110 coupled to and interlocking with a motor unit 109.

A high-speed feeder 115 is disposed in a path from the exit of the curved path 5B to the vicinity of the end in the expanded moving zone 7. This feeder 115 drives the transport cars 10 at high speed. A reciprocating self-propelled tramcar type high-speed feeder 115 can be suitably used.

Loading means 116 are disposed for a preceding process in the dense moving zone 6, on the upstream side of the feed-in means 95. Transfer means 117 for transferring the conveyed objects 29 are provided between the loading means 116 and the transport car 10. Unloading means 118 are disposed for a following process at an inlet of the curved path 5B in the expanded moving zone 7, and transfer means 119 for transferring the conveyed objects 29 between the unloading means 118 and the transport car 10.

In an embodiment of the conveying method by the transport car 10 of this embodiment as shown in FIG. 13, the transport car 10 is stopped so that its front end corresponds to the position of the feed-in means 95, and the conveyed objects 29 which were e.g. painted in the preceding step of the process and then loaded by the carry-in means 116, are transferred to the support for conveyed objects 25 of the transport car 10 by the transfer means 117.

The transport car 10 loaded with the conveyed objects 29 is moved outwardly toward the friction feeder 70, by operating the feed-in means 95 in the same manner as the friction feeder 70. At this time, the front contact bumper 56 of the transport car 10 fed by the feed-in means 95 which contacts the rear contact bumper 57 of the rearmost transport car 10 of the group of transport cars 10 connected in a row in a train on the conveyor path 5, and the group of transport cars 10 are thereby moved forward. The feed-in means 95 stops its action when the front end of the corresponding transport car 10 enters the friction feeder 70. At this time, the cylinder unit 81 in the friction feeder 70 is extended, swinging the supporting member 74 outwardly about the axis 75 to disconnect the friction drive roller 79 from a moving point of the driven face 15 of the transport car 10 as shown by a broken line in FIG. 8. The transport car 10 is thus fed in without any resistance.

Next the cylinder unit 81 is contracted to press the friction drive rollers 79 against the driven face 15 on one side of the transport car 10 as shown by the solid line in FIG. 8, and at the same time, the opposite driven face 15 is contacted to the counter roller 84 thus to clamp the front movable body 12 between the rollers 79 and 84. At this time, the friction drive roller 79 is rotated in the feeding direction by the motor 76. Thus, the transport car 10 is driven forward by feed rotating force A of the friction drive roller 79 to push and move the group of transport cars 10 which are connected in to a train on the conveying path 5 in the dense moving zone 6.

At this time, the guidance means 30, 31 and 40 of the transport cars 10 are engaged with the guide rails 3 so that the moving level and moving direction are restricted by the supporting rollers 35, 47 and lateral steadying rollers 36, 48, thus the transport cars 10 can be smoothly driven by maintaining a prescribed attitude.

A feed of the transport car 10 by the friction feeder 70 is detected by an encoder or the like, and when a preset amount of feed is achieved, feeding is terminated by the friction driving roller 79 being disconnected from the driven face 15 of the transport car 10 by the cylinder unit 81. The transport car 10 moving on the conveying path 5 is braked by the friction brake 90. Thus, while the propelling operation of the transport car 10 by the friction feeder 70 is stopped the friction brake 90 is contracted and the friction brake roller 91 is disconnected from the driven face 15 of the transport car 10. When the friction feeder 70 starts the propelling operation, the friction brake roller 91 is moved against the driven face 15 and is pressed against the driven face 15 of the transport car 10 being pushed and driven.

Since the friction brake roller 91 is rotated in the reverse feed direction by the torque motor 92, though the backward propelling force exerted on the transport car 10 by the reverse rotating force B, as the formed feed rotating force A is larger than the reverse rotating force B, the friction brake roller 91 actually rotates in the feed direction at the rate of the difference between them, and the load at the time is absorbed by the torque motor 92.

By this operation, the transport car 10 at the friction brake 90 is pushed and driven while being braked so that a plurality of transport cars 10 are aligned in close contact without any gaps between them. The braking operation by the friction brake 90 is automatically stopped when the propelling operation by the friction feeder 70 is stopped. Then, the transport car 10 is pushed and driven from the friction brake 90 reaches the feed-out means 96.

The transport car 10 is thus intermittently moved at a prescribed speed in the dense moving zone 6 and it passes through the drying oven 60 shown in FIG. 6. The painted conveyed objects 29 are thereby dried. Since the conveyed objects 29 moved through the drying oven 60 by the friction drive 70, the guide rails 3 may be laid close to the floor thus also to lower the transport car 10 and to minimize the required space inside the drying oven 60.

The propelling of the transport car 10 by the friction feeder 70 is performed by the friction drive rollers 79 seriatim engaging the driven face 15 of the front movable body 12, the driven face 15 of the center movable body 13, and the driven face 15 of the rear movable body 14.

As shown in FIG. 2 in the linear path 5A, since the main body 11 of the transport cars 10, and the movable bodies 12, 13 and 14 are in a linear disposition when viewed from above and from the side, the front bumper 56 directly contacts the rear bumper 57 and it is thus pushed and driven smoothly and reliably.

As shown in FIG. 14, when viewed from above the movable bodies 12, 13 and 14 are pushed and driven at the coupling means 20 along the curve of the curved horizontal path 5B. Thus, when viewed from above, the relative angle Θ formed between the rear movable body 14 of the preceding transport car 10 and the front movable body 12 of the following transport car 10 is an obtuse angle, and the front bumper 56 contacts the rear bumper 57 at an obtuse angle for pushing and driving. The angular displacement between the movable bodies 12, 13 and 14 is brought about by their swinging about the vertical pin 23 of the coupling means 20. Since the guidance means 30, 31 are horizontally swingable about the vertical pin 32, and the guidance means 40 is horizontally swingable about the vertical pin 45, they are automatically directed along the horizontal curve of the guide rails 3.

Figure 15:
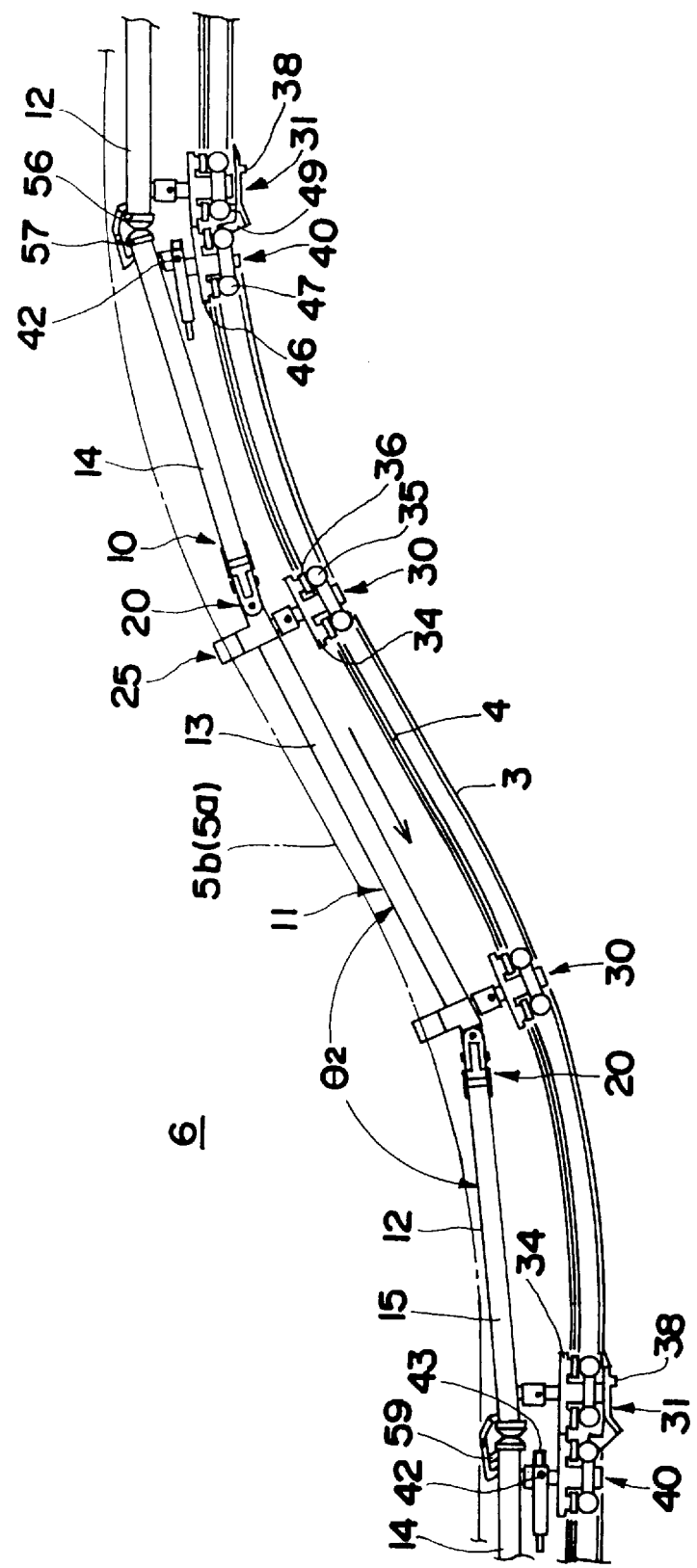
FIG. 15 is a side view of the transport car at an ascending and descending path in the conveying path.

In the case of running on the ascending linear path 5a and the descending linear path 5b, as shown in FIG. 15, when viewed from the side, the relative angle Θ2 between the rear movable body 14 of the preceding transport car 10 and the front movable body 12 of the following transport car 10 is an obtuse angle, and the front bumper 56 contacts the rear bumper 57 at an obtuse angle for pushing and driving. The coupling means 20 bends between the movable bodies 12, 13 and 14 by swinging about the horizontal pin 21. Since the guidance means 30, 31 are vertically swingable about the horizontal pin 33, and the guidance means 40 is vertically swingable about the axis 42A of the horizontal pin 42, they are automatically directed along the vertical curve of the guide rails 3.

At the end of the ascending path 5a, and the start of the descending path 5b, defined by the relative angle Θ2, the trolley body 34 of the guidance means 30 in the front movable body 12 of the following transport car 10 contacts to the trolley body 46 of the guidance means 40 in the rear movable body 14 of the preceding transport car 10, and the front bumper 56 does not contact to the rear bumper 57.

Figure 16:
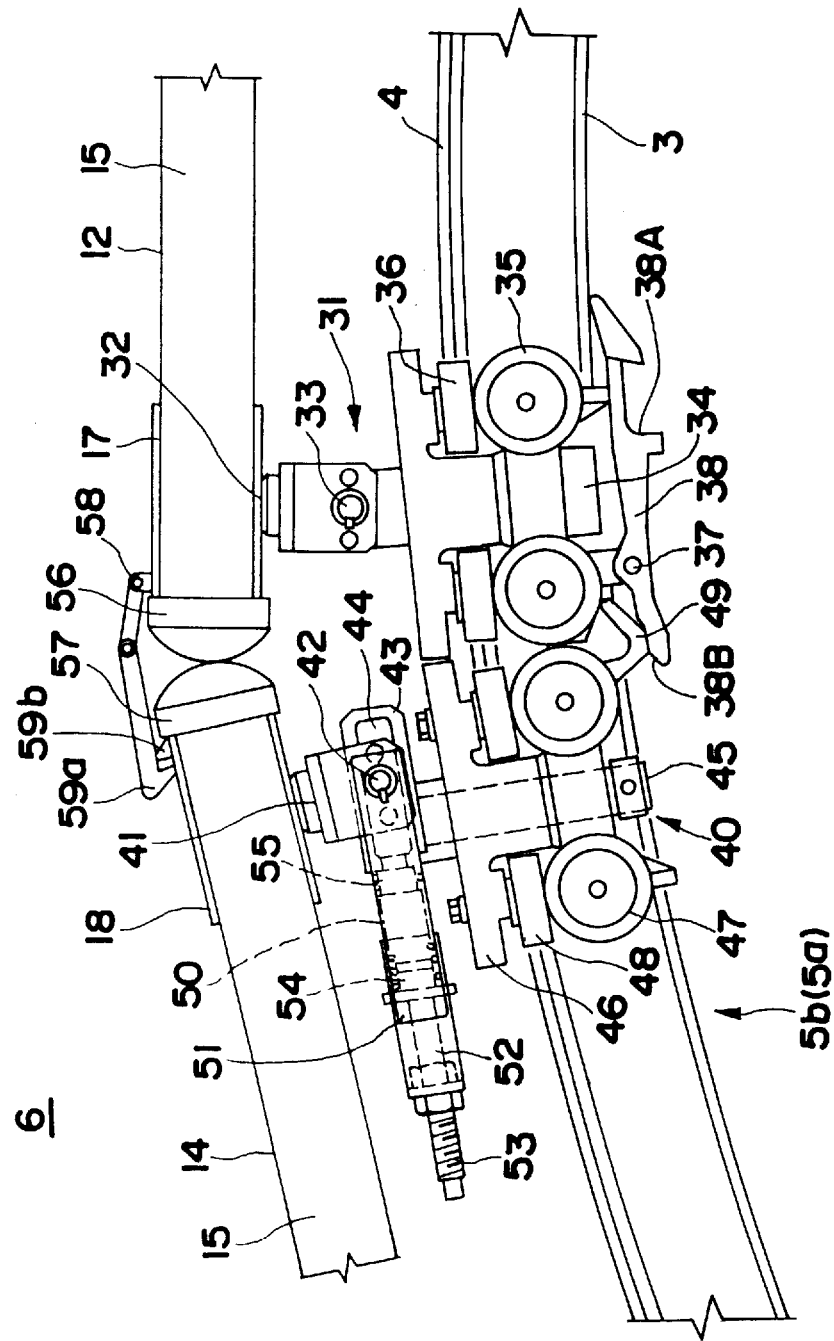
FIG. 16 is an expanded side view of a contact portion between the transport cars at the ascending and descending paths.

However, as shown in FIG. 16, the movable body 43 swings about the horizontal pin 42 (along the horizontal axis 42A) relative to the bracket 41 under the bias between the trolley bodies 46, 34, and moves forward against the urging force of the spring 50. The guidance means 40 of the rear movable body 14 moves relatively forward and since the trolley bodies 46, 34 are contacting each other, an actual pushing force is reliably transmitted from the following transport car 10 to the preceding transport car 10 by the mutual contact between the bumpers 57 and 56.

The movable body 43 returns backwardly by the urging force of the spring 50 when after moving into the horizontal path the rear movable body 14 of the preceding transport car 10 and the front movable body 12 of the following transport car 10 become horizontal. The movable body 43 moves within its front-to-rear free moving range defined by the movement of the horizontal pin 40 in the slot 44.

The transport car 10 reaching the feed-out means 96 forwarded by the feed-out means 96 to the expanded moving zone 7. Where, as shown in FIGS. 10–13, the drive chain 102 of the disengageable feeder 100 is driven by the motor unit 109, and the pushers 107 provided at a prescribed pitch engage the lever 38 of the transport car 10 move it into the expanded moving zone 7. Thereby, the transport cars 10 are expanded at a predetermined pitch and are moved in the expanded moving zone 7 at a constant speed by the pushers 107.

When the preceding transport car 10 is stopped by a stopper disposed at any location in the expanded moving zone 7, the operating face 38B of the lever 38 of the following transport car 10 runs over the drive-release actuator 49 of the preceding transport car 10 to cause the lever 38 to swing so that the rear end rises to disengage the engaging face 38A of the lever 38 from the pusher 107. Thereby, the following transport cars 10 can be stopped on the upstream side of the stopper for storage.

By stopping the transport car 10 at the unloading means 118, the conveyed objects 29 on the transport car 10 can be transferred to the unloading means 118 by the process and transfer means 119. The empty transport car 10 is then driven to the exit of the curved horizontal path 5B by the disengageable feeder 100. Then, the high-speed feeder 115 acts on the transport car 10 and the empty transport car 10 is fed at high speed to the dense moving zone 6 and is stopped after reaching the feed-in means 95.

By engaging the hooked applying lever 59a in the expanded moving zone with the engaging protrusion 59b of the following transport car 10 to the preceding transport car 10, the group of transport cars 10 can be connected into a train, and the linked group of transport cars 10 can be pulled by traction by the disengageable feeder 100 and high-speed feeder 115 acting on the front transport car 10. It is to be understood that, where the transport car 10 is pushed and driven by connecting the transport cars 10 in train by the 59a engaging the engaging protrusion 59b, the group of transport cars 10 on the upstream side of the friction feeder 70 can be pulled by traction, and the group of transport cars 10 on the downstream side of the friction feeder 70 can be driven by being pushed by the hooked engaging lever by the friction feeder 70.

The guidance means 31 of the front movable body 12 can be variably coupled to the front movable body 12 through the guidance means 40 of the rear movable body 14, or it or the guidance means 31 can be variably coupled to the movable bodies 12, 14.

In this embodiment of the invention the lever 38 is disengageable from the pusher 107. Although the main body 11 of the transport car 10 has three bar-shaped movable bodies 12, 13 and 14, the number of movable bodies making up the main body 11 can be any other number above two. In this case, the position of the movable body including the support for conveyed objects 25 can be disposed at the front the rear or at any intermediate position of the main body 11.

The coupling means 20 is not restricted to those provided with the horizontal pin 21 on the center movable body 13 and the vertical pin 23 on the front and rear movable bodies 12, 14. For example, the center movable body 13 can be provided with the vertical pin and the front and rear movable bodies 12, 14 can be provided with the horizontal pin, or they can be rotatably connected to each other by other means, such as by ball joints.

In the friction feeder 70, feed-in means 95, feed-out means 96 and friction brake 90 in this embodiment of the invention, although the friction drive roller 79 and the friction brake roller 91 are driven rollers, and the counter rollers 84, 93 are freely rotating rollers or driven rollers, the counter rollers 84, 93 are disengageable from the driven face 15 of the transport car 10. Although, the guide rails 3, and the channel guide rails 101 are laid on the floor, they can be laid in a pit under the floor to lower the total height of the apparatus above the floor, including that of the transport car 10.

Figure 17:
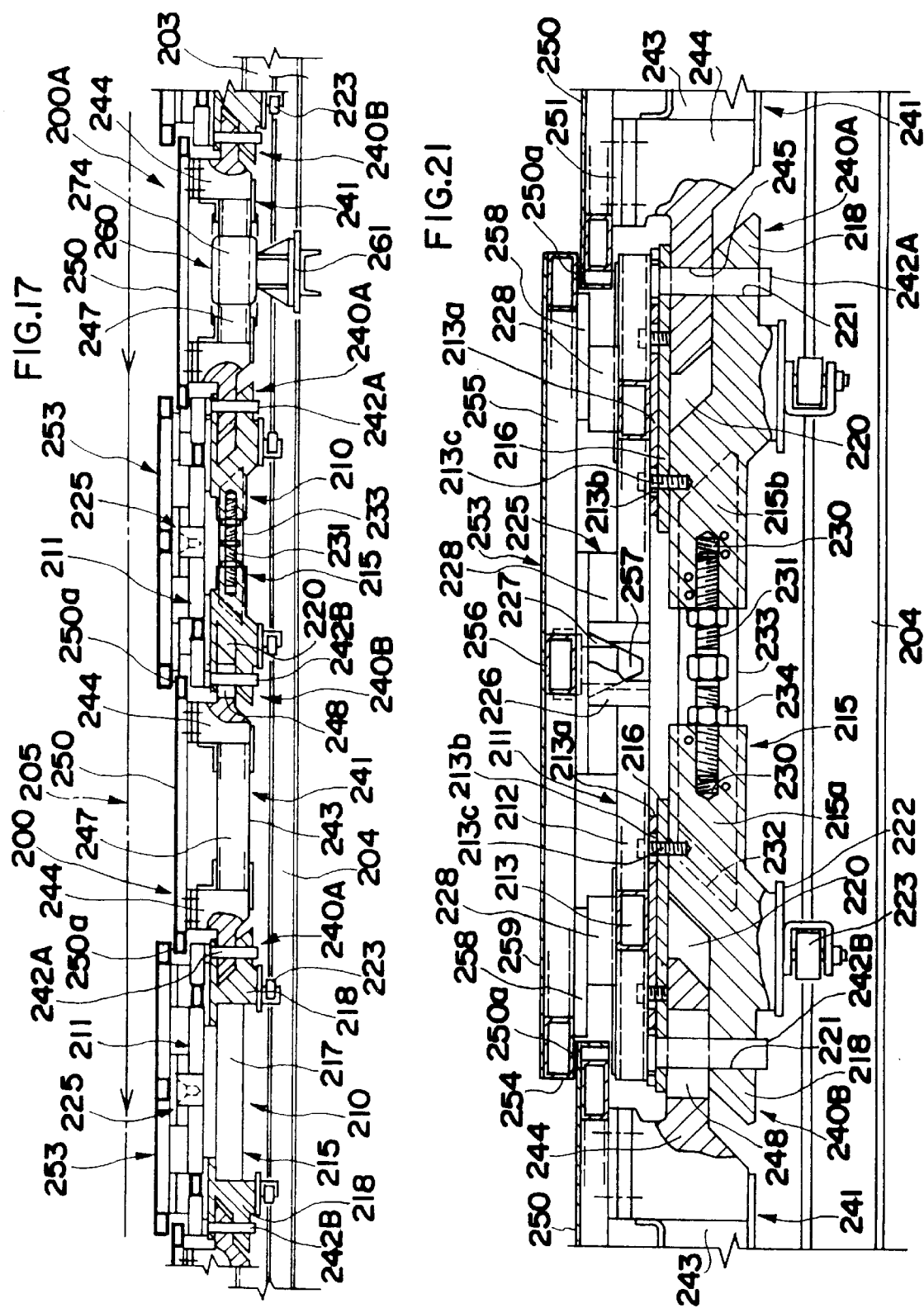
FIG. 17 is a cross-sectional side view of a second embodiment of the present invention with transport cars being coupled.
Figure 18:
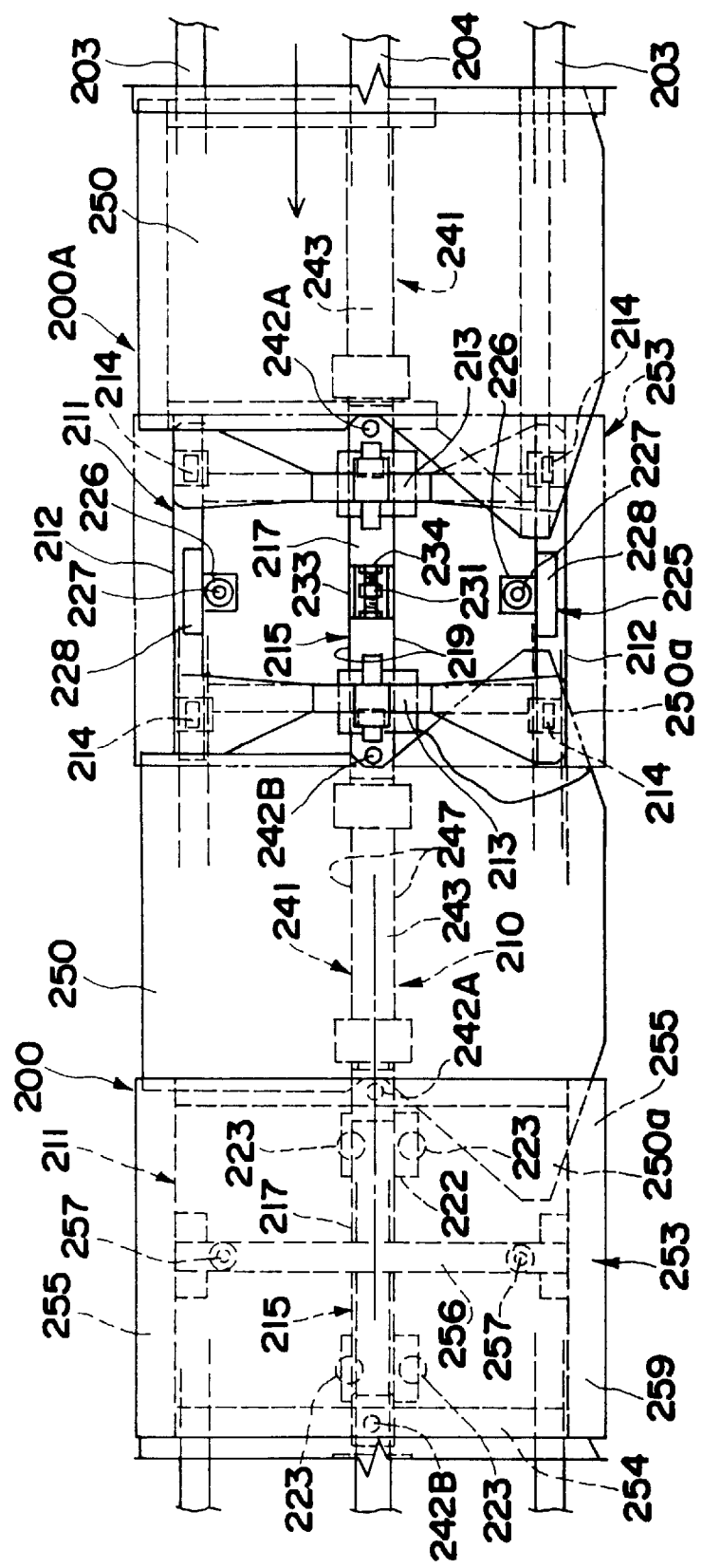
FIG. 18 is a partly cut away plan view of the coupling of the transport cars.
Figure 22:
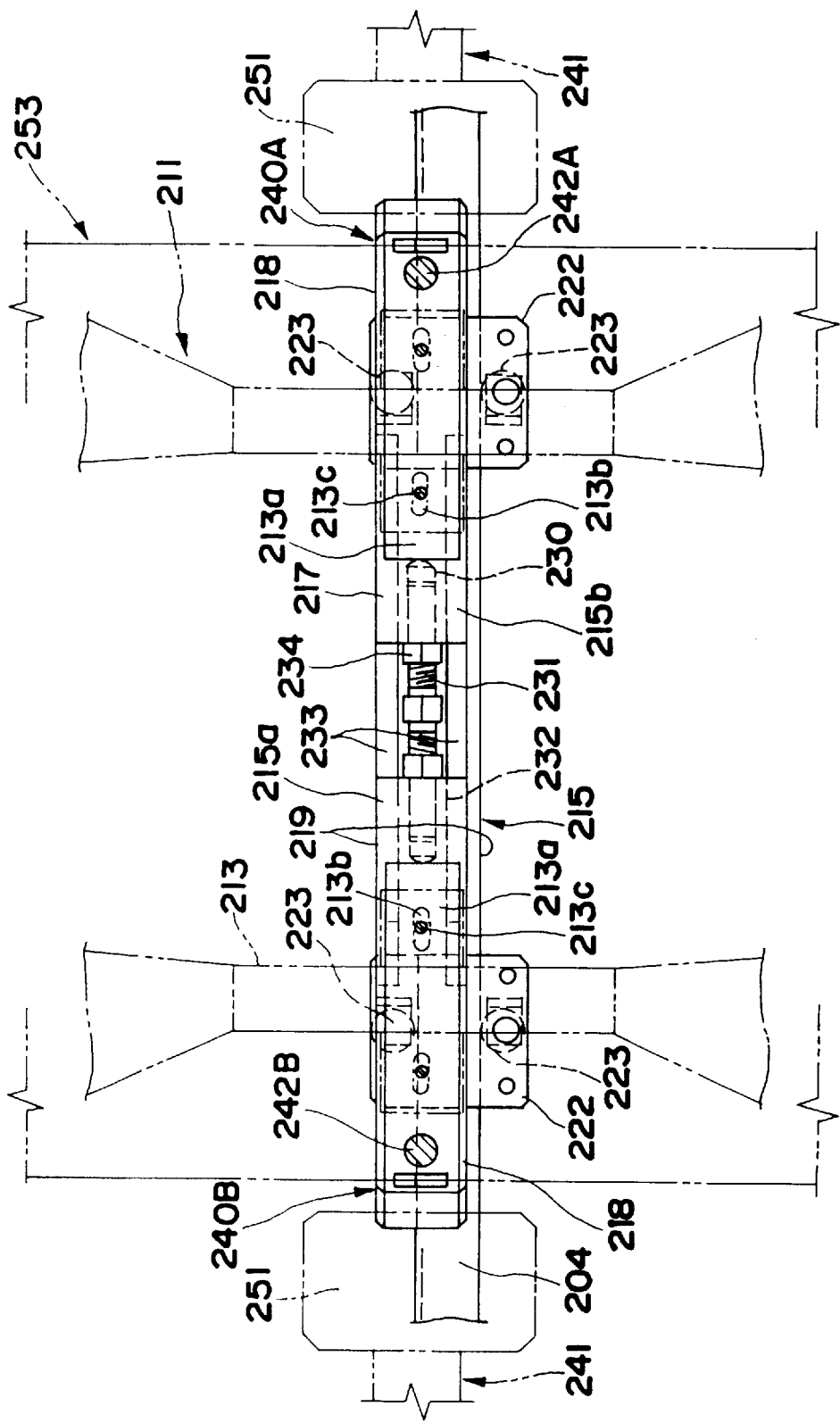
FIG. 22 is a cross-sectional plan view of the transport car with a lengthwise adjustable body.

In a second embodiment of the present invention described with reference to FIGS. 17 through 25 as shown in FIGS. 17 through FIG. 19, and in FIG. 25, a frame 202 is disposed on a floor in a pit 208 formed under a floor 201. V-shaped supporting guide rails 203 are laid right and left on the frame 202 with their open portions facing outwardly, laterally steadying guide rails 204 of the same kind of U-shaped steel members are laid over the frame 202. The guide rails 203, 204, define an endless conveying path 205 of linear paths 205*a* which are parallel to each other, and curved horizontal paths 205*b* between start and end portions of the linear paths 205*a*.

A transport car 200 is supported and guided by the supporting guide rails 203 for movement along the conveying path 205, and as shown in FIGS. 17 and 18, the car has a main body 210, a support for conveyed objects 253 and a loading deck 250. The main body 210 has two straight movable bodies 215, 241 coupled by coupler 240A. The transport cars 200 are connected to an endless train by the coupler 240B. The support for conveyed objects 253 is disposed on a frame 211 supported on the front movable body 215 of the main body 210, and the loading deck 250 is supported on the rear movable body 241 of the main body 210.

The frame 211 has a rectangular shape formed by lateral longitudinal members 212 in the travel direction, and by front and rear lateral members 213. Freely rotating wheels 214 are mounted at respective front and rear ends of longitudinal members 212 for rolling on the supporting guide rails 203. As shown in FIG. 21 additional support-225 is attached inside a center portion of the longitudinal members 212 of the frame support 211, and has blocks having a vertical positioning hole 227, and receiving members 228 fixed at plural locations on the longitudinal members 212. As shown in FIG. 19, the frame support 211 is set so that its upper surface is slightly below the surface 29*a* of the floor 201.

As shown in FIGS. 17 through 19, and in FIG. 21, the support for conveyed objects 253 on the frame support 211, is formed as a flat frame by a window of longitudinal frames 255 and lateral frames 256 located inside the outer frame 254, and lateral positioning pins 257 located thereunder and being engageable in the vertical positioning holes 227 of the additional supporting means 225. Spacer plates 258 are supported by the receiving members 228. If required, a flat plate 259 can be positioned on the frames 254–256.

The front movable body 215 is located under the frame support 211 at its lateral center parallel to the running direction of the car. It has a main body 217 having a square cross section and connecting block 218 formed on the front and the rear ends of the main body 217, with the sides of laterally steadying the connecting block formed as flat driven faces 219. Under the connections 218, rollers 223 mounted from brackets 222 clamp the laterally steadying guide rails 204 between them at the front and at the rear. 222 clamp the laterally steadying guide rails 204 between them at the front and at the rear.

The rear movable body 241 supporting the loading deck 250 is formed with a square cross section main body 243, and connection 244 located on front and rear ends of the main body 243. The side faces of the main body 243 are formed as flat driven faces 247. The loading deck 250 is attached to the upper side of the connections 244 at opposite ends of the rear movable body by a mounting plate 251 (FIG. 21). The loading deck 250 has substantially the same width as that of the support for conveyed objects 253. On one side positioned outside of the supporting guide rails 203, a triangular protrusion deck 250*a* protrudes toward the front and rear when running on the curved horizontal path 205*b* shown in FIG. 25, and as shown in FIG. 18. The protrusion deck 250*a* is disposed at a position above the frame support 211 under the support for conveyed objects 253.

The coupler 240A coupling the front movable body 215 and the rear movable body 241 includes the adjoining connections 218, 244 of the movable bodies 215, 241, and a vertical pin 242A laterally swingably connecting the connections 218, 244. The coupling means 240B coupling the transport cars 200 to each other includes the rear connection 244 of the rear movable body 241 of the front transport car, the front connecting block 218 of the front movable body 215 of the rear transport car 200, and a vertical pin 242B laterally swingably coupling the connections 218, 244. The main body 210 of at least one of the transport cars 200A among the transport cars 200, has an adjustable length.

As shown in FIGS. 17, 18, 21, and 22, the front movable body 215 supporting the frame 211 in the main body 210 of the transport car 200A is divided into front and rear movable bodies 215*a*, 215*b*. Each of these is provided with concentric opposed horizontal threaded bores 230 in the front-to-rear direction on the opposed end faces thereof. They are also adjustably coupled by a threaded shaft 231 having inverse threaded portions at opposite ends for engaging the threaded bares 231 and two locking nuts 234. Front-to-rear depressions 232 are formed on opposite sides of the movable bodies 215*a*, 215*b* and a joint plate 233 for continuing the flat driven faces 219 is attached between the front and rear depression 232, to one movable body 215*b* by means of a set screw or the like. The joint plate 233 is attached to the other movable body 215*a* by a set screw and a front-to-rear slot.

Since the length of the frame support 211 is fixed on the adjustable length the movable body 215*a*, mounting plates 216 are secured to the connecting block 218 at opposite ends of the movable body 215*a*, and mounting plates 213*a* are overlappingly secured to the frame 211 and are connected by slots 213*b* in the mounting plates 213*a* in the running direction and motion limiting bolts 213*c* extending through the long holes 213*b* and engaging the mounting plates 216.

the invention. The coupler 240B between the adjustable length transport car 200A, and the rear transport car 200, is movable in the running direction to a limited extent.

The connecting blocks 218 at opposite ends of the front movable body 215 supporting the frame support 211 for conveyed objects 253 include vertical bores 221 for accommodating the vertical pins 242A, 242B, and depressions 220 are formed between the mounting plates 216 secured to the connecting blocks 218. The connections 244 at opposite ends of the rear movable body 241 supporting the loading deck 250 of the transport cars 200, 200A can be inserted into the depressions 220, and the vertical bores 245, 248 communicating with the bores 221. The vertical pins 242A, 242B are inserted through and are supported by the mounting plates 216 that in turn are inserted into the vertical bores the 221, 245 or into the bores 221, 248, at the coupler 240B between the adjustable length transport car 200A and the front transport car 200. The bore 248 at the connection 244 is formed into a horizontal slot as shown in FIG. 21.

As shown in FIG. 25, a friction feeder 260 is disposed at a predetermined location of the conveying path 205, or at a location near the end of one linear path 205a. The friction feeder 260 acts on the side driven faces 219, 247 of the main body 210, of the transport cars 200, 200A. As shown in FIGS. 17, 19 and 20, the friction feeder 260 includes a friction feed roller 268, a motor 265 for driving the roller, and a cylinder unit 270 which moves the friction feed roller 268 against and away from the driven faces 219, 247.

A shaft 262 is mounted from a base 261 on the floor 201 on the side of the supporting guide rails 203, and a support member 263 is swingably supported by a bearing 264 about the shaft 262. The motor 265 and its reduction gear 266 are mounted from the support member 263, and the friction feed roller 268 made from e.g. polyurethane, is attached to an output shaft 267 that extends upwardly from the reduction gear 266. An extension 269 is provided on the support member 263, and the cylinder unit 270 is interposed between the extension 269 and the base body 261 for swinging the support members 263. Rollers 271 supporting the support member 263 and an anti-floating roller 272 are pivoted from the base body 261.

The support member 263 is swung about the shaft 262, by actuating the cylinder unit 270, to move the friction feed roller 268 against and away from the driven side faces 219, 247. A limit detector 273 is provided for restricting the maximum and minimum approaches of the friction feed roller 268 against the driven faces 219, 247. A counter idler roller 274 pivoted by a shaft 275, for the friction feed roller 268 faces toward and contacts the other driven side faces 219, 247. The linear path 205a is provided at a plurality of locations with the friction feeder 260, and work stations 279. As shown in FIG. 25, lifts 280 are disposed at the work stations 279 for lifting the support for conveyed objects 253 from the transport cars 200, 200A.

Figure 23:
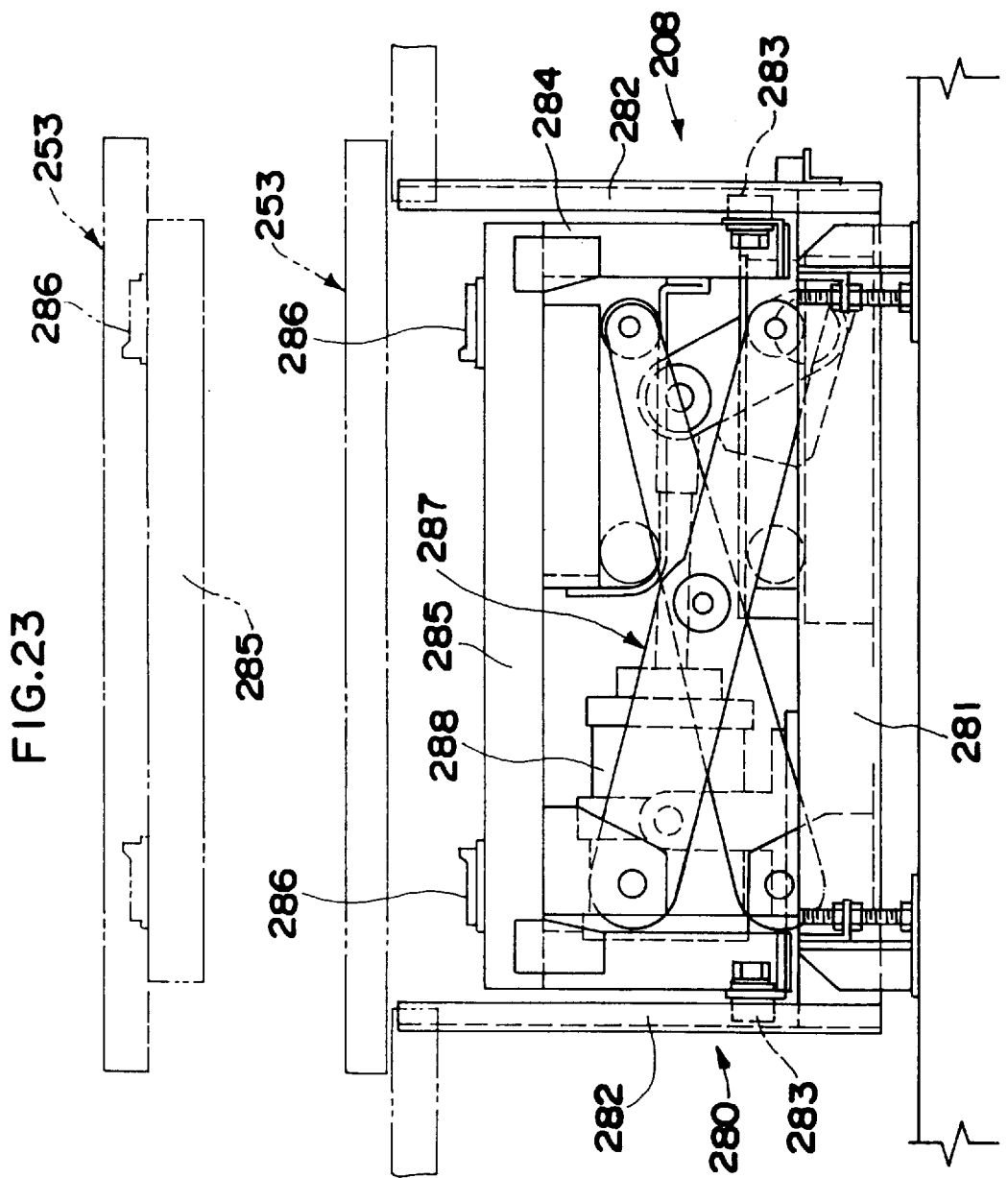
FIG. 23 is a side view of a lift used in the second embodiment.

As shown in FIG. 23 and FIG. 24, a flat frame 281 is disposed on the floor 201, and guide members 282 are erected from the four corners of the frame 281 outside the supporting guide rails 203. Lift members 284 guided by rollers 283, are disposed on the guide members 282. Lift girders 285 are disposed in the running direction between the upper ends of a pair of lift members 284. Contact pads 286 are provided on the lift girders 285 for freely contacting the support for conveyed objects 253 from below. Pantographs 287 are disposed between the lower portions of the frame 281 for moving the lift girders 285 up and down. A cylinder unit 288 is provided for synchronously operating the pantographs 287.

As shown in FIG. 25 at an outlet of the curved horizontal path 205b, after passing the friction feeder 260, the conveying path of a ceiling suspension conveyor 290 is disposed intersecting the conveying path 205 at two locations. The intersection near the curved horizontal path 205b is formed as on unloading station 291, and the intersection point away from the curved horizontal path 205b is formed as a loading station 292. A self-driven truck having a hanger on a chain-driven trolley can be suitably used as the ceiling suspension conveyor 290. Suitably an engaging member of the hanger can be engaged to the support for conveyed objects 253 for positioning the hanger.

In the operation of the second embodiment of the present invention a conveying system using transport cars 200, 200A, the front movable body 215 can be adjusted to absorb the error when the vertical pin 242B moves horizontally from the approximate center of the vertical base 248 in the coupler 240B between the transport car 200A and the following transport car 200 due to an error in the total length of an endless train, of the main body 210. One side of the joint plate 233 shown in FIG. 21 is removed and the threaded shaft 231 is turned while loosening the set screw fixing the other joint plate 233 to the movable body 215a. The front and rear movable bodies 215a, 215b are thereby movable toward and away from each other to adjust the total length of the movable body 210 with the front movable body 215. This also adjusts the vertical pin 242B at the coupler 240B to position it at an approximate center of the vertical bore 248. The screw shaft 231 is fixed by the locking nuts 234 after adjustment. The bolts 213c connecting the mounting plate 216 on the side of movable bodies 215a, 215b, and the mounting plate 213a on the side of frame support 211 are loosened before adjusting the length of the front movable body 215 and are tightened after the adjustment. The running direction of the front movable body 215 and the running direction of the support for conveyed objects 253, are also approximately centered at this time.

In operation of the endless train from a number of transport cars 200, 200A the transport cars 200, 200A are standing still, the cylinder unit 270 is the friction feeder roller 268 is separated from the driven faces 219, 247 as shown by a broken line of FIG. 20.

When the endless train of transport cars 200, 200A is driven, the cylinder unit 270 is contracted to move the driven friction feed roller 268 toward the moving path of the main body 210 and is pressed against one driven faces 219, 247, bringing the other driven faces 219, 247 against the counter roller 274 as shown by solid lines in FIG. 20. Thereby the movable bodies 215, 241 are clamped by the rollers 268, 274 to propel them and to drive the endless train of the transport cars 200, 200A on the conveying path 205. As the transport cars 200, 200A connected into an endless train are driven by the friction feed 260 the expansion coupler 240B with the vertical bore 248 is pushed and driven by the vertical pins 242A, 242B, and the transport cars 200, 200A are driven by the expansion coupler 240B and the vertical pin 242A, 242B.

A change in the number and positions of the vertical pins 242A, 242B rotating in the two curved horizontal paths 205b causes a change in the length of the endless train, i.e. the sum of distances between the longitudinal pins 242A, 242B as the endless train traveling on the conveying path 205 with the two semicircular curved horizontal paths 205b.

Changes of length of the endless train in the curved horizontal paths 205b are absorbed in the endless train of the present embodiment as a portion in the running Changes of length of the endless train in the curved horizontal paths 205b are absorbed in the endless train of the present embodiment as a portion in the running direction permits expansion by the expansion coupler 240B with the vertical bore 248, through a relative front-to-rear movement of the vertical pin 242B in the vertical base 248. Thus, there is never an excessive tension on the transport cars 200, 200A connected into an endless train, and no unreasonable slack will occur.

The transport cars 200, 200A moving on the conveying path 205 are supported and guided on the supporting guide rails 203 by the freely rotating wheels 214, and by the laterally steadying rollers 223 rolling on the laterally steadying guide rails 204. Thus the transport cars 200, 200A are driven smoothly parallel to the conveying path 205.

A feeding of the transport cars 200, 200A by the friction feeder 260 is detected by an encoder, and when a preset extent of feed is reached the friction feed roller 268 is disconnected from the driven faces 219, 247 to stop the transport cars. Thereupon the amount of feed is set to stop the transport cars 200, 200A at work stations 279, and the contact pads 286 of the lift girders 285 face the underside of the four corners of the support for conveyed objects 253.

The operator at the work station 279 at this stage can actuate a switch to raise the lift 280. The cylinder unit 288 is actuated to raise the lift members 284 by the pantographs 287, and the contact pads 286 support the four corners of the support for conveyed objects 263 from below to lift it to a prescribed height as shown by a broken line in FIG. 23. As the support for conveyed objects 253 and the conveyed objects thereon are so lifted, various work can be carried out on the conveyed objects by the operator. When the prescribed work is completed, the operator actuates the switch to lower the lift 280, whereby the lift members 284 descend and the support for the conveyed objects 253 is returned onto the transport cars 200, 200A.

Various work on the conveyed objects 253 on their support, can also be carried out by the operator on the loading deck 250. That is, the operator can step onto the loading deck 250 from the floor surface 201a to carry out the work on the conveyed objects while the transport cars 200, 200A are either standing still or are moving.

When the transport cars 200, 200A move on the curved horizontal paths 205b, the protrusion deck 250a of the loading deck 250 is pulled out from between the adjoining supports for the conveyed objects 253 and the frame support 211, and a portion on the rotating center side of the loading deck 250 advances into a space between the adjoining supports for conveyed objects 253 and the frame support 211. Thereby, the loading deck 250 fills the spaces between the supports for the conveyed objects 253 even at the curved horizontal paths 205b and thus eliminate any dangerous gaps. This presents no collision problem between the loading deck 250 and the supports for conveyed objects 253.

The transport cars 200, 200A can also be automatically stopped at the unloading station 291 and the loading station 292. Thus when the transport cars 200, 200A supporting the conveyed objects are stopped after the desired work was performed at the unloading station 291, the conveyed objects can be lifted by the ceiling suspension conveyor 290 together with the support for conveyed objects 253 and transferred to the next process stage. After the thus unloaded transport cars 200, 200A are stopped at the loading station 292, and the conveyed objects were transferred by the suspension conveyor 290, they can be loaded onto the frame support 211 of the transport cars 200, 200A together with the support for the conveyed objects 253.

The loading decks 250 can be omitted from the transport cars 200, 200A in this embodiment of the present invention, with the supports for conveyed objects 235 being seriatim aligned in the running direction of the train. The main body 210 which is shown having the front and rear movable bodies 215, 241, can also have three or more movable bodies. In the latter case the supports for conveyed objects 253 can be supported on any of the movable bodies from among the front, rear, and intermediate movable bodies. It is also possible to lay the supporting guide rails 203 and laterally steadying guide rails 204 on the floor surface 201a without using the pit 208.

In either of the aforementioned embodiments, it is also possible to provide the guide rails supporting and guiding the transport cars on the ceiling rather than on the floor, and suspending the transport cars from the guide rails to run underneath, and the support for conveyed objects can be suspended below the transport car.

Though the driven faces of the movable bodies of the main body of the transport car are flat, and the friction feed roller is used as driving feeding roller of the feeder, the driven faces can also have a different profile, such as a rack or chain to utilize a pinion or a toothed wheel driven by a motor as the feed roller.

In a third embodiment of the present invention described with reference to FIGS. 26–30, transport cars 300 are connected to one another by couplers 308 into an endless train, and each has a main body 306 having three elongated, square cross-section movable bodies 301–303 coupled by couplers 304, 305 and a truck-type moving car for supporting conveyed objects 307. The moving car support is disengageable from the main body 306.

The couplers 304, 305 making up the transport car 300 and the couplers 308 connecting the transport cars 300 to each other, are constructed similarly. The layout of the conveying path can be the same in this embodiment of the invention as the conveying path of the second embodiment shown in FIG. 25, since, as shown in FIG. 29, the transport cars 300 run on an elliptical, endless conveying path including linear paths 309A, 309B, which are parallel to each other, and curved horizontal U-turn path portions 309C, 309D connecting opposite ends of the linear paths 309A, 309B. As shown in FIG. 27, the couplers 304, 305, 308 horizontally swingably couple the front and rear movable bodies by connecting male members 310 each on a rear end of a movable body 301, 302, 303, by vertical coupling pins 313 fixed in the female members 311 and extending through coupling pin holes 312 in the male members 310. The couplers 305 coupling the center movable body 302 to the rear movable body 303 are designed to absorb any errors between the total length of the elliptic endless conveying path shown in FIG. 29 and of the length of all transport cars 300 connected in an endless train, by the coupling pin hole 312 which is elongated in the direction of the square cross-section movable body 302.

Trolleys 315, 316, 317 are rotatably mounted as guidance means under and near the front ends of the movable bodies 301, 302, to 303. Guide rollers 318, 319, 320 are pivoted about the vertical axis 314 above and near the front ends of the movable bodies 301, 302, 303. The trolleys 315, 316, 317 are movably supported on right and left guide rails 321 laid along the elliptical endless conveying path, and include supporting wheels 322 pivoted about a substantially equidistant vertical axis 314 and engaged to the guide rails 321, and laterally steadying rollers 323 pivoted about each side of the vertical axis 314 between the guide rails 321. A cylindrical member 325 including a vertical pin hole 324 is secured at the position immediately after the guide roller 319 of the center movable body 302.

As shown in FIGS. 26, 28 and 30, the truck-type moving car for supporting conveyed objects 307 includes right and left wheels 326 near its front and its rear ends running freely on a floor surface 327. The guide rails 321 are laid at a suitable depth under the floor surface 327 so that the main bodies 306 of the transport cars 300 connected into an endless train can run under the floor surface 327, within guide slits 328 formed by right and left rails 329 secured thereto so that, the moving path of the pin hole 324 is right above when the main body 306 of the transport cars 300 connected in endless train moves along the elliptical endless conveying path shown in FIG. 29. Right and left flat rails 327*a* are laid on the same level as the floor surface 327 at positions where the wheels 326 rotate.

A vertically movable coupling pin 330 is provided at a lateral center near the front end of the truck type moving support for conveyed objects 307. A vertically movable pivot 331*a* including a guide roller 331, at its lower end, is provided at a lateral center near the rear end of the truck-type support.

When the coupling pin 330 moves downwardly, it protrudes below the floor surface 327 through a guide slit 328 and ranges into the vertical pin hole 324 of the main body 306 of a transport car 300. At this time, the coupling pin 330 does not contact the rails 329 on both sides of the guide slit 328. When moved downward, the guide roller 331 freely ranges into the guide slit 328 of the floor surface 327. At this point, the guide roller 331 contacts and rotates along either of the rails 329 on both sides of the guide slit 328 to prevent the rear-end of the truck type moving car support for the conveyed objects 307 from swinging to either side.

As shown in FIG. 29, a feeder 332 is disposed at a suitable location of the elliptical endless conveying path, for example, near to the start of one of the linear paths 209A. The feeder 332 has a pair of friction feed rollers 334*a*, 334*b* pressed against each long side of flat vertical driven faces 333*a*, 333*b*, formed by the side faces of the main body 306 or the side faces of the movable bodies 301, 302, 303. The pair friction feed rollers 334*a*, 334*b* are both driven by a motor and are pressed against the driven faces 333*a*, 333*b* by a cylinder unit (not shown).

In this last mentioned configuration, after assembling the portions under the floor surface 327, the coupling pin 330 of the truck-type moving car for supporting conveyed objects 307 placed on the floor surface 327 ranges downwardly through the guide slit 328 and becomes engaged to the pin hole 324. Then the vertical pivot 331*a* is lowered to engage the guide roller 331 to the guide slit 328. By operating in reverse sequence, the truck-type moving car for supporting conveyed objects 307 on the floor surface 327 of the transport cars 300 can be disconnected from the main body 306 under the floor surface 327 and can be removed from the conveying path for repairs and the like.

In use of this embodiment of the present invention, by driving the motor and pressing the friction feed rollers 334*a*, 334*b* of the feeder 332 against the flat driven faces 333*a*, 333*b* on both sides of the main body 306, the transport cars 300 connected into an endless train can be rotated along the elliptical endless conveying path. At this time, the truck-type moving car for supporting conveyed objects 307 is coupled to the main body 306 of the transport cars 300 by the coupling pin engaging 330 in the pin hole 324, is running on the floor surface 327.

The truck-type moving car for supporting conveyed objects 307 running on the floor surface 327 is driven straight without any serpentine motion, because the moving path of the coupling pin 330 on the front end is determined by the pinhole 324 of the main body 306 guided by and running on the guide rails 321 under the floor surface 327, and the moving path of the guide roller 331 on the rear end is determined by the guide slit 328 in the floor surface 327 engaging the guide roller 331.

When the transport car 300 rotates at the curved horizontal U-turn portions 309C, 309D, the movable bodies 301, 302, 303 tend to slant outwardly from the U-turn portions 309C, 309D against the trolleys 315, 316, 317 positioned thereunder, due to centrifugal force exerted on the truck-type moving car for supporting conveyed objects 307. Thus, as shown in FIGS. 29 and 30, curved circular paths of guide rails 335 are disposed connecting from the outside guide rollers 318, 319, 320 pivoted above and near the front ends of the movable bodies 301, 302, to 303 as they rotate along the U-turn portions 309C, 309D to prevent any inconvenient occurrences.

It is possible to locate the guide rails also in the linear conveying paths 309A, 309B, to engage the guide rollers 318, 319, 320 from both sides.

In the U-turn portions 309C, 309D the position of the coupling pin 330 in the pin hole 324 on the side of the truck-type moving car for supporting conveyed objects 307 is spaced rearwardly from the vertical axis 314 which is rotating in the center of the trolley 316, the rotating position of the coupling pin 330 is shifted inwardly from the rotating position of the trolley 316, the rotating position of the vertical axis 314. Thus, as shown in FIG. 30, at the U-turn portions 309C, 309D, the guide slit 328 is formed to shift inwardly from the rotating position of the trolley 316 i.e. the rotating position of the vertical axis 314.

Also, as shown by a broken line in FIGS. 27 and 28, a slit cover 336 can be used for the guide slit 328. The slit cover 336 suitably has band plates 337 of fixed lengths connected one to another by means of vertical shafts or belts 338, both sides of which are placed slidably on the right and left rails 329 forming the guide slit 328, and also at locations, where the coupling pin 330 and the vertical pivot 331*a* on the side of the truck-type moving car for supporting conveyed objects 307 extend through, includes through holes of sufficient diameter for drawing through the coupling pin 330 and the guide roller 331 outward and upward.

Thus, when the truck-type moving car for the supporting conveyed objects 307 is pulled by the main body 306 through the coupling pin 330, the slit cover 336 is also pulled by the coupling pin 330 and covers the guide slit 328 it moves thereon with the truck-type moving car for supporting conveyed objects 307.

Although, three typical embodiments, of the present invention have been described, other embodiments can also be employed and can be combined with each other.

We claim:

1. A conveying system comprising guide rails disposed along a conveying path having curved sections, a plurality of transport cars each having a longitudinal axis and each being movably supported from said guide rails, and a friction feeder along said conveying path for the moving of said transport cars, said transport cars each comprise (i) a main body having a front end and a rear end and being movably supported from said guide rails by guidance means, (ii) a support on the main body of each of said transport cars for objects to be conveyed, said main body having a plurality of elongated, unitary movable bodies each having a front and rear end, (iii) coupling means located at said front and rear end of said movable bodies for joining said elongated, unitary movable bodies to allow a relative yielding motion between said bodies at said curved sections, each of said coupling means being vertically and horizontally swingable, said movable bodies being vertically and horizontally swingably joined to one another by said coupling means and selectively coupling adjacent ones of said movable bodies directly to each other to form a continuous conveying structure along said longitudinal axis, said movable bodies each having a front end and a rear end, said movable bodies each having a lateral driven face along said longitudinal axis, said support for objects to be conveyed being provided on one of said movable bodies of each transport car, and wherein said friction feeder comprises a feed roller adapted to act on said driven faces, and a motor for driving said feed roller.

2. The conveying system of claim 1, wherein said front and rear ends of said main body are each provided with a contact portion for a front-end contact portion contacting a rear end contact portion of a preceding transport car as it is pushed by a following transport car.

3. The conveying system of claim 2, wherein in a first zone in said conveying path a transport car is driven by being pushed by said friction feeder, and in a second zone in said conveying path said transport car is driven by a disengageable feeder, said disengageable feeder comprising a driven body disposed at said front-end of said main body, drive-release operating means disposed at said rear-end of said main body, a pusher for moving along said conveying path and for engaging said driven body, said driven body and said pusher being disengageable from each other so that when the following transport car approaches a preceding stationary transport car, said drive-release operating means of the preceding stationary transport car disengage from said driven body of the following transport car and from said pusher.

4. The conveying system of claim 3, wherein said driven body of a transport car is mounted from guidance means disposed at a front end of the front movable body, and said drive-release operating means is mounted from guidance means disposed at a rear end of the rear movable body, wherein at least one of the guidance means in association with the driven body and the drive-release operating means is movably supported within a fixed range along said longitudinal axis relative to the movable body supporting said guidance means, and wherein said guidance means is held in a fixed position by a spring.

5. The conveying system of claim 1, further comprising an engaging piece on and of a transport car and an engageable portion on another and of another transport car are selectively engageable with one another, said engaging piece and said engageable portion connect the preceding and following adjoining transport cars with each other.

6. The conveying system of claim 1, wherein movable bodies of the main body of the transport car are coupled to each other by coupling means that are each laterally and horizontally swingable when the transport cars are connected into an endless train by the coupling means and said conveying path being endless so that said transport cars that are connected in endless train will circulate along said conveying path.

7. The conveying system of claim 6, wherein one of said movable bodies has said support for objects to be conveyed, and another of said movable bodies has a work deck.

8. The conveying system of claim 6, further comprising an expansion allowing portion to provide for expansion of the total length of part or all of said transport cars connected into said endless train.

9. The conveying system of claim 6, wherein at least one of said movable body of the movable bodies of a transport car is lengthwise adjustable along said longitudinal axis.

10. The conveying system of claim 1 wherein said support for objects to be conveyed has a moving car for supporting objects to be conveyed, said car being disengageable from said main body of the transport cars, and is movable on a moving path provided above said conveying path.

11. The conveying system claim 10, wherein said moving car has (i) a front end and a rear end, and (ii) a coupling pin movable up and down at said front-end, and a (ii) guide roller movable up and down at said rear-end, and said moving path has guide slit with said coupling pin extending movably therethrough, said main body of a transport car being provided with a pin hole with said coupling pin being engageable therethrough and being vertically disengageable.

* * * * *